Patented July 14, 1953

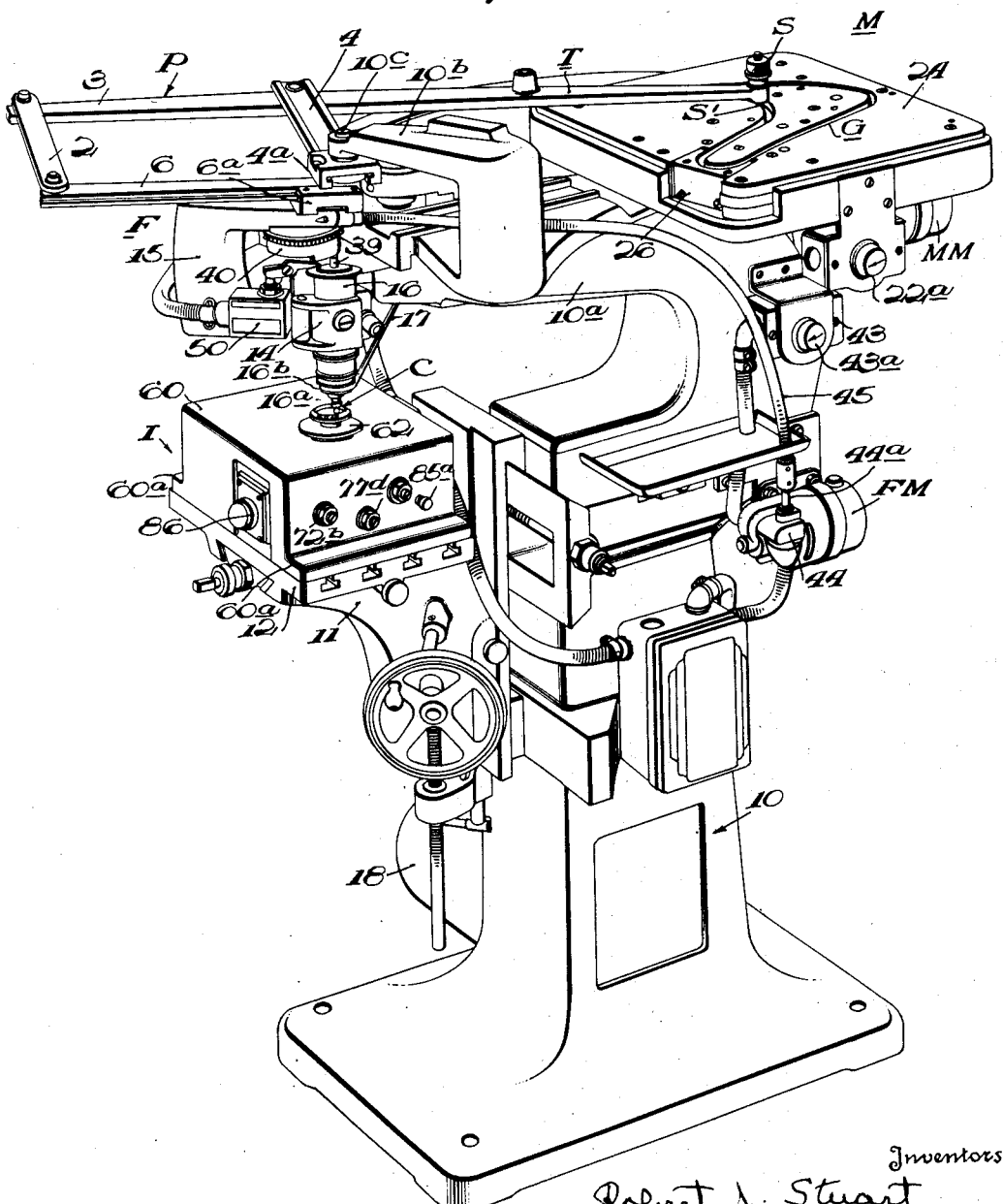

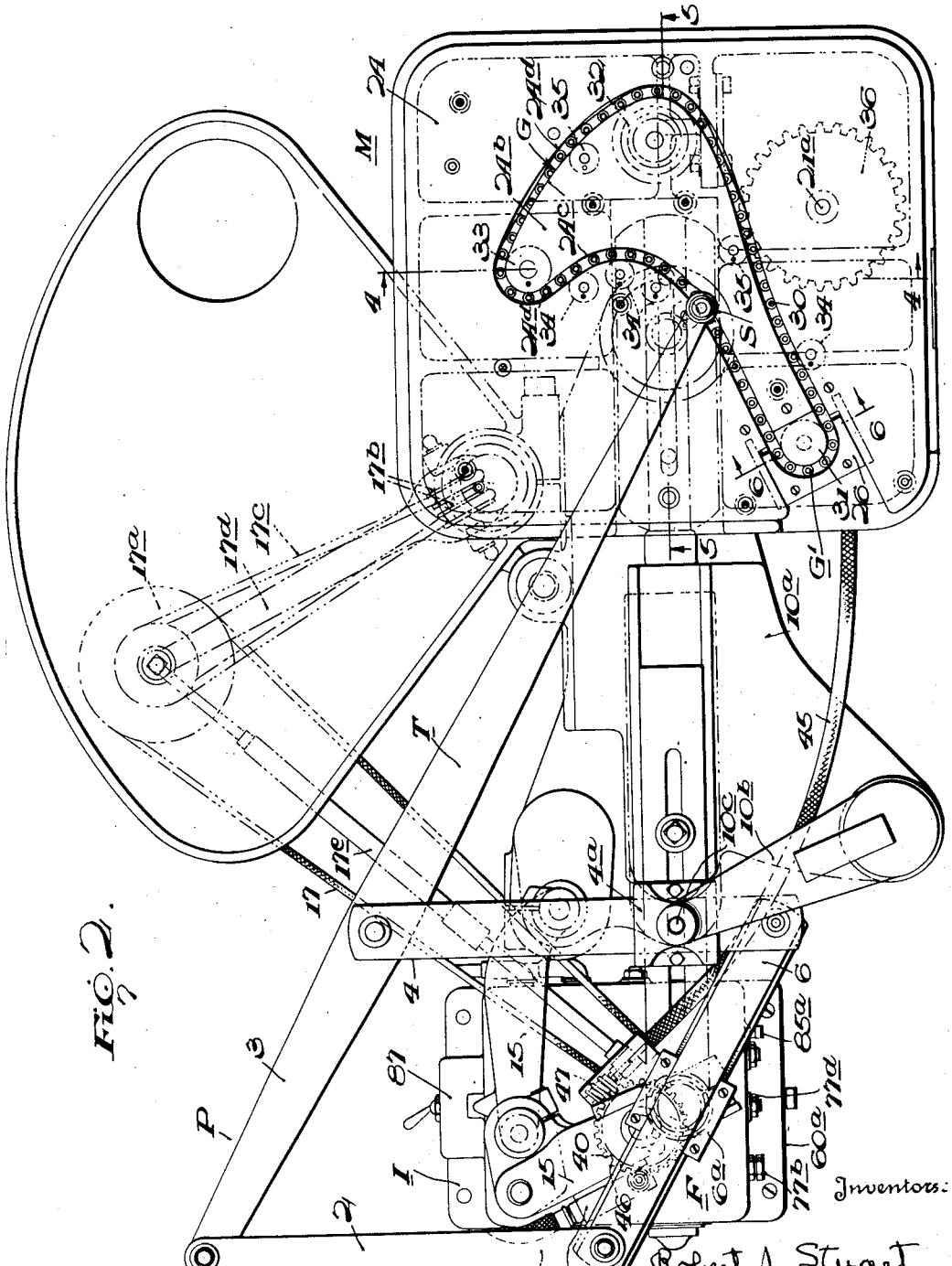

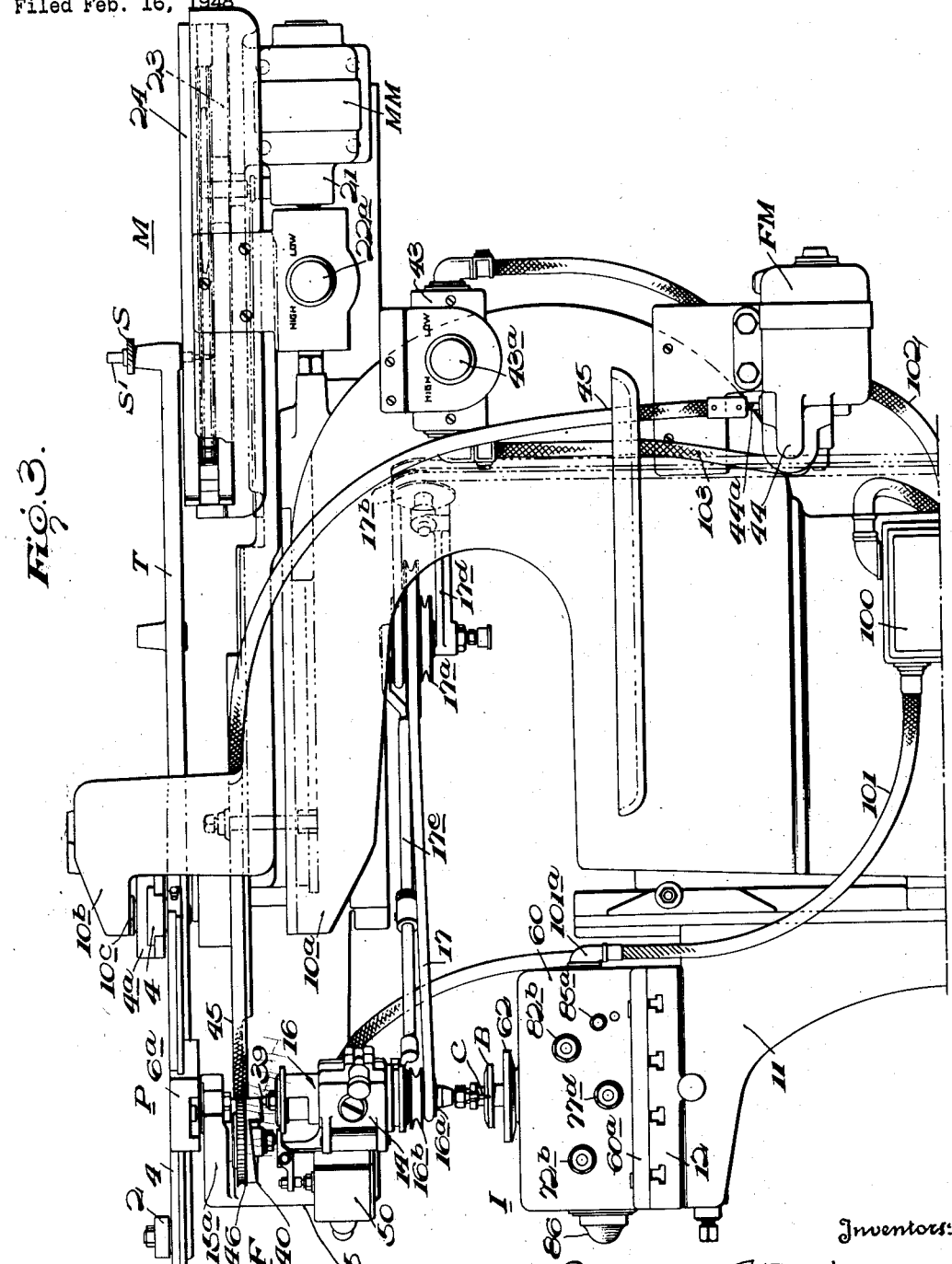

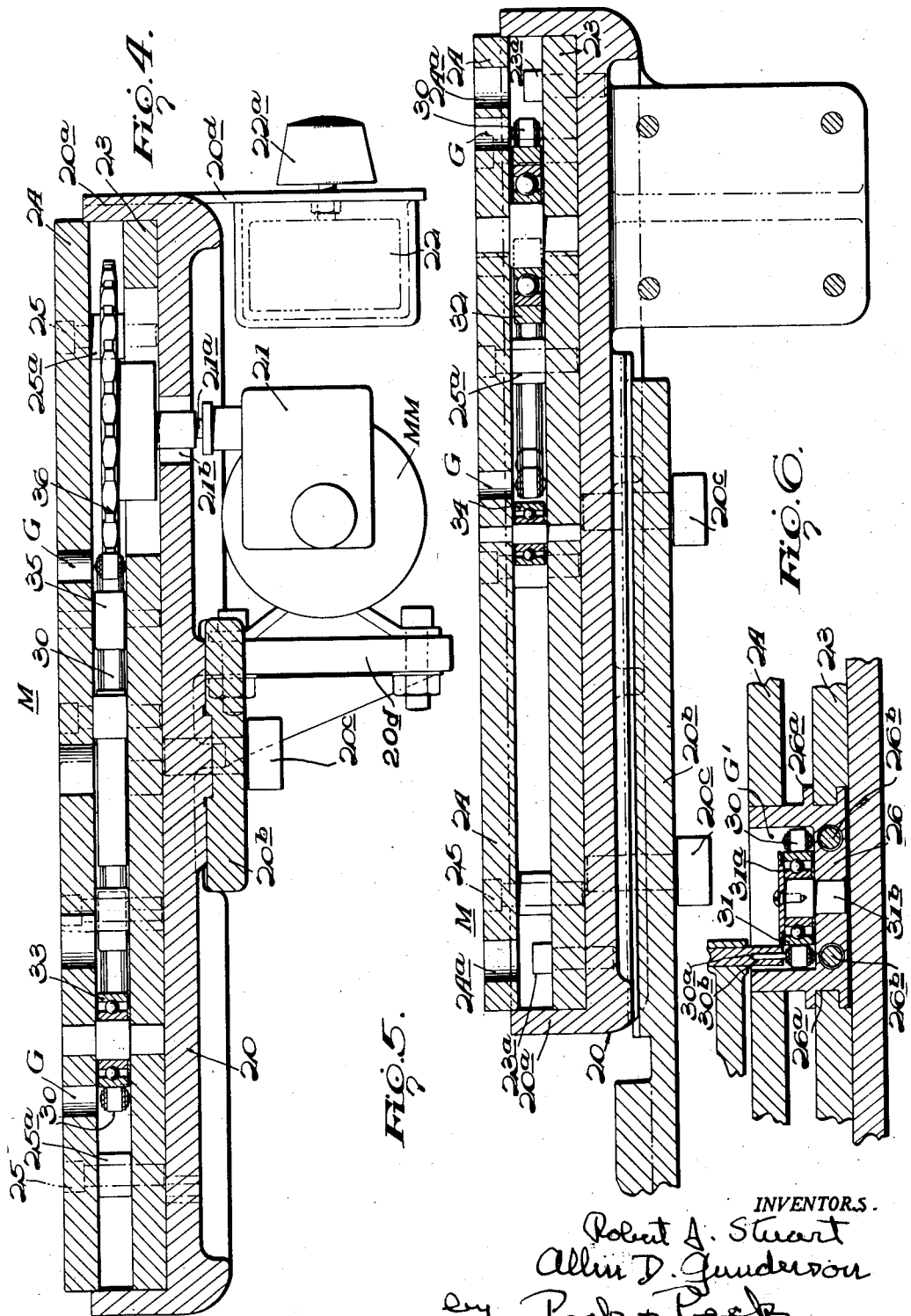

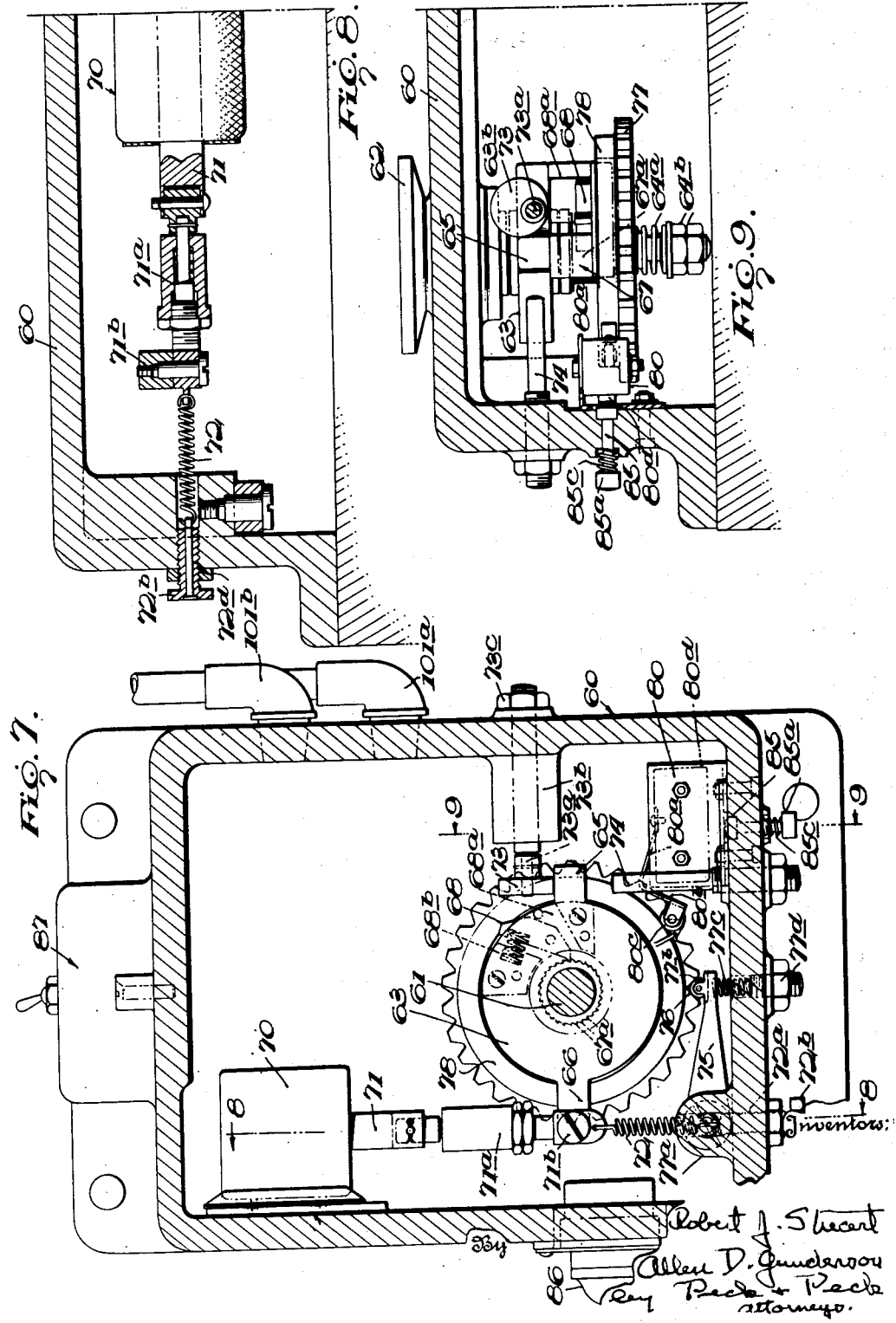

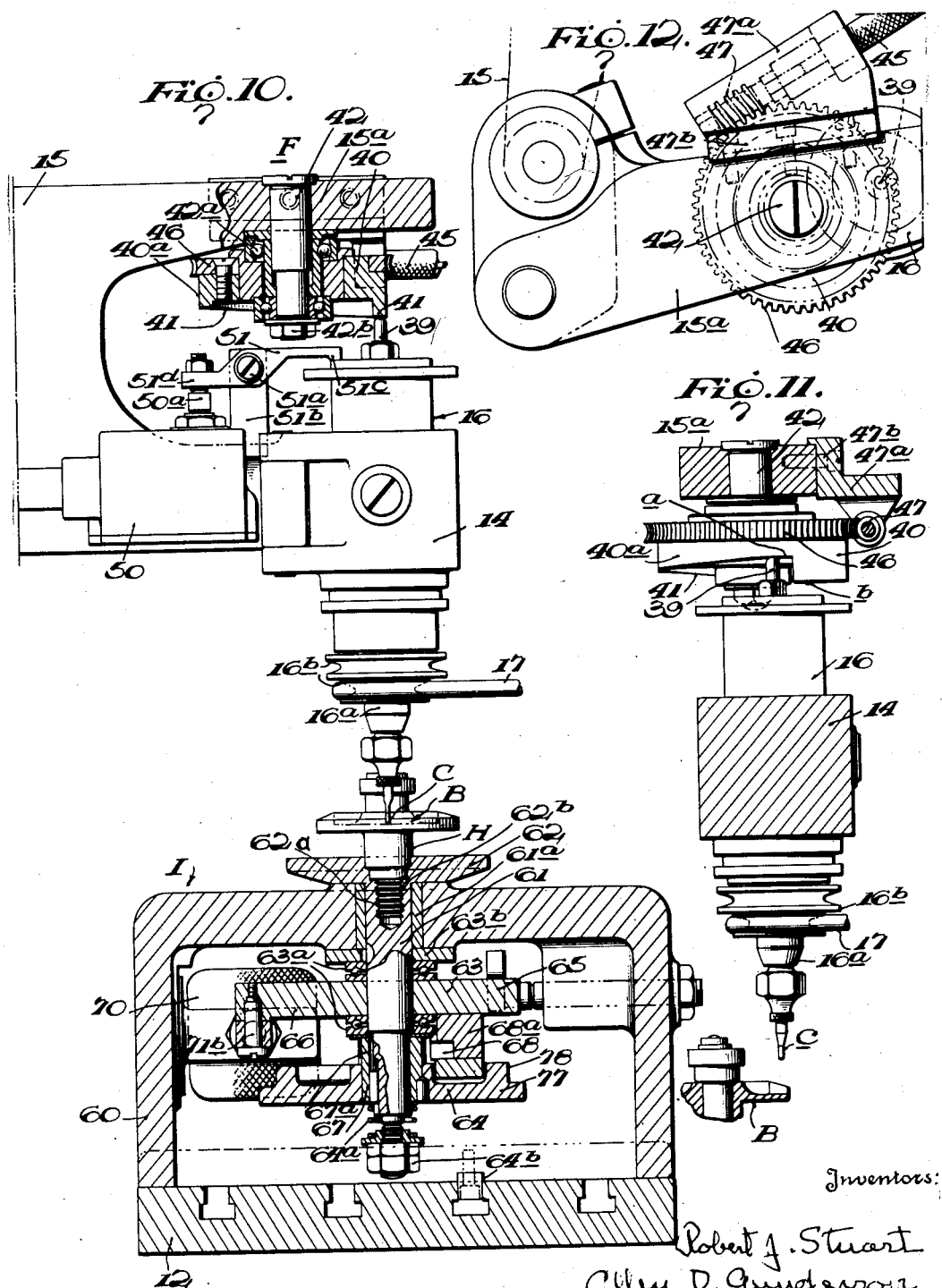

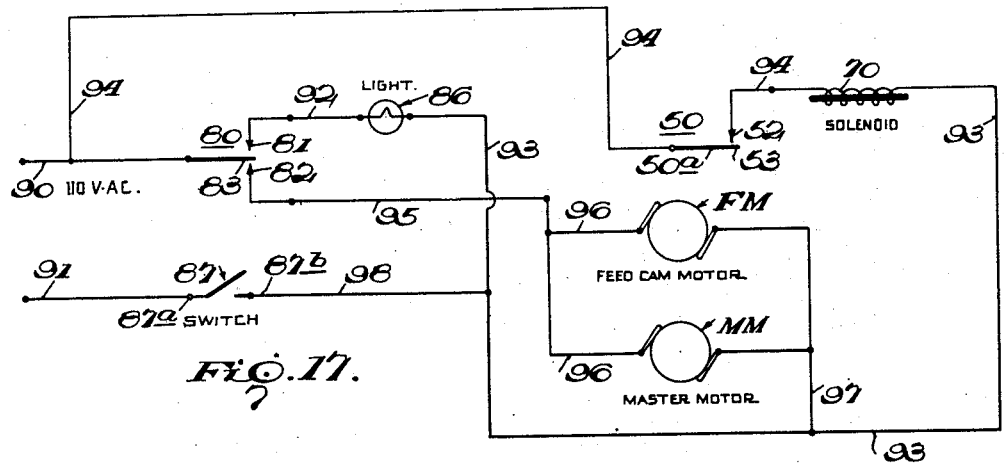
Fig. 17.
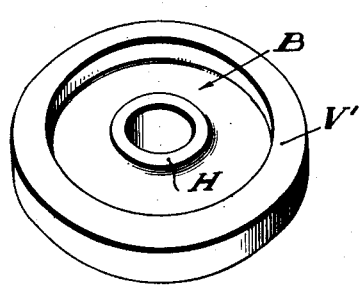
Fig. 13.
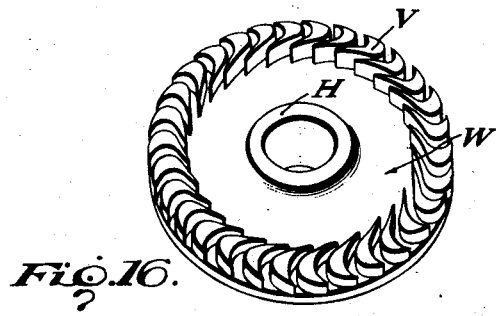
Fig. 14.
Fig. 16.
Fig. 15.
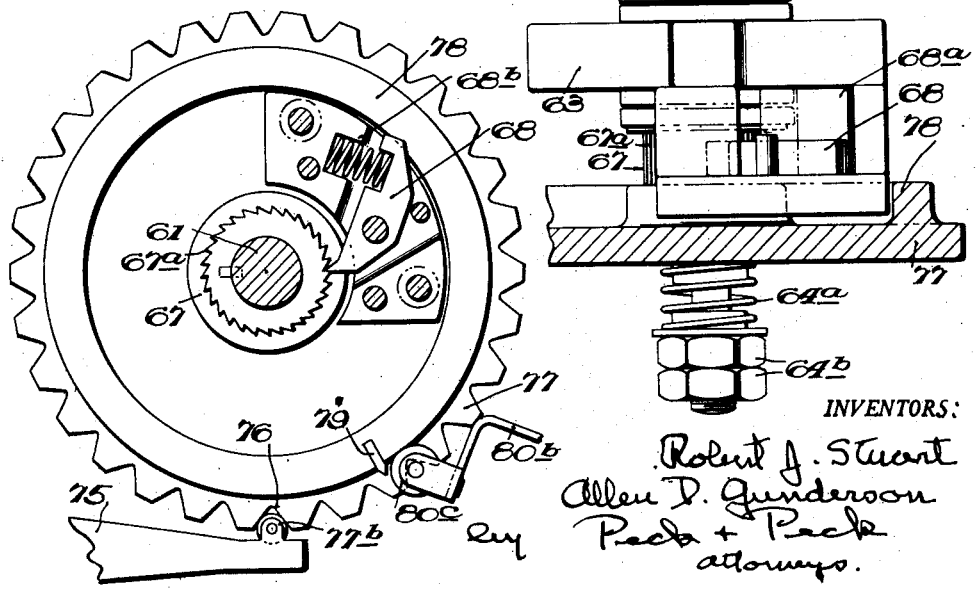
INVENTORS:
Robert J. Stuart
Allen D. Gunderson
Peck + Peck
attorneys.

2,645,161

UNITED STATES PATENT OFFICE

2,645,161

APPARATUS FOR THE PRODUCTION OF INTEGRAL BLADE TURBINE WHEELS AND THE LIKE UNITS

Robert J. Stuart and Allen D. Gunderson, Racine, Wis., assignors to George Gorton Machine Co., Racine, Wis., a corporation of Wisconsin Application February 16, 1948, Serial No. 8,496

22 Claims. (Cl. 90—13.1)

This invention relates to apparatus for producing integral blade turbine wheels and such like units; and the nature and objects of the invention will be readily understood by those skilled in the art in the light of the following detailed description and explanation of the accompanying drawings illustrating what we now believe to be the preferred embodiments or mechanical expressions of the principles and the several features of our invention from among various other embodiments, mechanical expressions, forms, arrangements, designs, and combinations, of which the invention is capable and adapted within the spirit and scope thereof.

Our invention is basically concerned with the production of elements or units of those types in which the unit includes a body having a series of identically shaped or contoured members formed integral therewith by cutting or removing material from the body to form such integral members thereon; and the invention is particularly directed to overcoming the problems, difficulties and disadvantages encountered in producing such an integral member unit in the form of a turbine or impeller wheel having a series of integral blades formed thereon by milling from the body of the wheel each of the series of the integral blades of the completed wheel unit.

With a unit such as a turbine wheel having a series of integral blades thereon, the blades must be formed as exact and precise duplicates in dimensions and contour and each must be accurately positioned on the turbine wheel with the allowable tolerances for error in contour, location and spacing of the blades restricted to within very close limits. The prevailing techniques and the available equipment for the production of such an element or unit as a turbine or impeller wheel having integral blades formed thereon by cutting or milling out the blades from a preformed wheel blank, are of a character primarily under the control of an operator and thus subject to and dependent upon the speed and the judgment and skill of each individual operator. The production of integral blade turbine wheel units by such operator dictated and controlled techniques and equipment, is an exacting, tedious and time consuming operation with resulting high costs of production. With such milling operations under the control primarily of the operator, the results are dependent upon the operator's speed, skill and judgment, so that, in addition to the extended time required to precisely cut or mill out the integral blades from the wheel blank to complete the wheel unit, there is also present a high error potential in the operations. And, an error in cutting or milling out even one blade of the series of blades of such an integral blade turbine or impeller wheel unit, will because of the high degree of precision required in the completed unit, usually necessitate discarding the incompleted wheel or if the error occurs in milling the last blade or blades of the series discarding the substantially completed wheel, notwithstanding the large amount of work and the extended time with the attendant high costs that may have been required to carry out the operations on the wheel blank to the point of the error.

It is, therefore, a general object of our invention to provide a method and apparatus for producing from a body or a preformed blank, a unit having integral members cut or milled therefrom, such as a turbine or impeller wheel unit having a series of integral blades thereon, by fully automatic operations, so that a wheel body or blank may be placed in working position in the apparatus and then by the application of the methods of the invention to the positioned blank, the apparatus can be caused to operate to fully automatically mill out, blade by blade, from the body or blank with a high degree of precision and at a relatively rapid rate of production, the complete series of integral blades in a single cycle of fully automatic operation without requiring operator intervention or control at any time during the cycle of automatic operations.

In carrying out the foregoing general objects, an apparatus exemplifying the invention in a form for milling out the integral blades of a turbine or impeller wheel may be primarily characterized by an organization which includes a power operated tracer and movement transmitting mechanism under the control of a pattern or master of the contour or profile of the turbine wheel blade, for transmitting the master controlled movements of such mechanism to a milling cutter spindle to move the spindle with its milling cutter through a cutting path in the body or blank from which the blades are to be milled to precisely mill or cut out the exact shape of each of the integral blades for the turbine wheel; a cutter spindle feed mechanism for progressively feeding and/or arresting the feed of the cutter spindle toward the blank being milled at predetermined rates and periods relative to the rate of speed at and the cycles through which the pattern controlled movement transmitting mechanism moves the cutter spindle around the path of the complete profile or contour of the blade, as determined by the number of complete passes the milling cutter must make around the contour for the required depth of the blade; and a body or blank holding and positioning organization for automatically moving the blank from position to position accurately located for the milling out of each blade respectively, of the series of blades upon completion of each preceeding blade of the series until the entire series of blades has been milled out and the automatic cycle completed.

A further object is to provide an apparatus having the foregoing basic characteristics which will be efficient and reliable in operation with a minimum of maintenance or adjustment required under service conditions, and which will be of simple mechanical and structural design to occupy a minimum of space and to locate the component organizations thereof and the operator controls therefor in readily visible and accessible locations to the operator.

Another object is to provide an efficient and accurate power driven tracer and movement transmitting organization in the association with and controlled by an exact pattern or master of the contour of the integral members of a series of such members which are to be milled out from a blank; and further to provide in such a power driven tracer and movement transmitting mechanism for the ready removal and accurate mounting of patterns or masters for operative guiding association with the tracer of the movement transmitting mechanism.

Another object is to provide a power operated tracer and movement transmitting organization in which the transmission of the movement of the master guided tracer with the cutting or milling tool is through the medium of a pantograph mechanism of the adjustable type so that enlarged patterns or masters of the contour and profile of a member to be milled out may be employed and by which the pantograph mechanism will efficiently function to reduce the master controlled movements of the tracer to exact member profile or contour defining movements of the milling cutter in the work piece or blank.

A further object is to provide a design and arrangement for an apparatus of the invention and of the component organizations of which it is formed, of such a character that a standard type of pantograph engraving machine may be utilized to provide the basic structure and certain of the component organizations of the apparatus of the invention, without requiring extensive major redesigning and reorganization of the basic structure, components, and the arrangements thereof of the engraving machine.

Another object is to provide simple and efficient means for automatically progressively feeding and/or arresting the feed of the milling cutter relative to the body or blank at a rate and through a cycle as may be required to produce the particular integral members of the unit being milled; and further to provide in such feeding mechanism for readily varying the rate of progressive feed and/or the rate of speed at which the mechanism moves through a complete feeding cycle, and/or the point or points in such cycle at which progressive feed is arrested as well as the period or periods of time during which such arrestation is maintained.

A further object is to provide a design and arrangement of the spindle feed mechanism by which such mechanism may be mounted on and carried by the movable supporting structure for the cutter spindle head and in operative feeding association with the cutter spindle; and further to provide an efficient mounting and arrangement of power drive for said spindle feed mechanism, so mounted and associated with the cutter spindle and its movable supporting structure.

A further object is to provide such a spindle feed mechanism with a power driven cam element for feeding engagement with the cutter spindle, which cam element may be readily removed and replaced by another cam element of different spindle feed characteristics as may be required by the particular milling operations to be performed.

And a further object is to provide such a spindle feed mechanism of the power driven type capable of adjustment to selectively vary the rates of spindle feed and to permit of such adjustment independently of the adjustment in the rates of speed of the power driven feed and movement transmitting mechanism in order that the rates of speed of the spindle feed and the movement transmitting mechanism can be readily synchronized to meet the requirements of each particular unit to be milled.

Another object is to provide a work indexing mechanism for positioning and holding the body or blank from which the integral members are to be milled, which mechanism will automatically upon the completion of the milling of each integral member thereon, accurately reposition the blank for the milling of the next member from the blank of the series of integral members from the blank.

A further object is to provide for the automatic control of the indexing mechanism from the cutter spindle feed controlling mechanism in such a manner that the automatic repositioning of the cutter spindle to inactive cutting position by the feed mechanism upon the completion of an integral member will cause functioning automatically of the indexing mechanism to reposition the blank during the time period provided between the removal of the cutter spindle from cutting position and the return movement automatically of that spindle by the feed mechanism to milling position for forming the next integral member; and further to provide for the control by the indexing mechanism of both the power driven tracer and movement transmitting mechanism and the power driven cutter spindle feeding mechanism to stop operations of such mechanisms upon completion of the milling out of the last member of the series of integral members and the resultant termination of the unit completing, automatic cycle of the apparatus.

It is a further general object to associate and combine in the single apparatus in a structurally and mechanically simple and functionally efficient manner, the power driven tracer and movement transmitting mechanism, the cutter spindle feed mechanism, and the work indexing mechanism, and to so coordinate and synchronize the functioning interdependently of such mechanism as to provide for the fully automatic cycle during which the integral member unit may be produced by the milling out, member by member, of the complete series of integral members from a blank.

With the foregoing and various other objects, features and results in view, which will be readily apparent from the following detailed description and explanation, our invention as to the apparatus consists in the novel design and construction of parts and elements and in the combinations thereof, and as to the method resides in the novel sequences of steps, all as will be more fully referred to and pointed out hereinafter.

Referring to the accompanying drawings in which similar reference characters refer to corresponding elements throughout the several figures thereof:

Fig. 1 is a perspective view of an apparatus of our invention for automatically producing integral blade turbine wheels, a wheel blank being shown in mounted position on the indexing work holders with several of the integral blades of the wheel completed.

Fig. 2 is a top plan view of the apparatus of Fig. 1.

Fig. 3 is a view in side elevation taken from the front of the apparatus of Figs. 1 and 2, the lower portion of the supporting column and base not being shown.

Fig. 4 is a vertical section taken as on the line 4—4 of Fig. 2, through the power operated tracer mechanism and pattern or master plate and the mounting base structure therefor.

Fig. 5 is a vertical section taken as on the line 5—5 of Fig. 2.

Fig. 6 is a detailed view in vertical section taken as on the line 6—6 of Fig. 2, through the movable block and end roller unit for the chain of the power driven tracer mechanism.

Fig. 7 is a view in top plan of the automatic work indexing mechanism with the cover or top plate therefor removed, and showing the work supporting spindle in horizontal section.

Fig. 8 is a detail vertical sectional view taken as on the line 8—8 of Fig. 7.

Fig. 9 is another detail vertical sectional view taken as on the line 9—9 of Fig. 7.

Fig. 10 is a view in side elevation of the cutter head, cutter spindle and spindle feed mechanism and of the work indexing mechanism therebelow with the turbine wheel blank in mounted position thereon in operative cutting engagement by the milling tool of the cutter spindle, the side of the indexing mechanism having been removed.

Fig. 11 is a view in side elevation showing the cutter spindle and the spindle feed cam in their relative positions mounted on the cutter head and the cutter head supporting link, respectively, with the cutter spindle engaged with the feed cam and the milling cutter on the spindle engaged with a turbine wheel blank, a portion only of the blank being shown.

Fig. 12 is a view in top plan showing the mounting of the spindle feed cam and its driving worm and shaft on the cutter head supporting link.

Fig. 13 is a perspective view of a preformed turbine wheel blank.

Fig. 14 is a perspective view of the completed turbine wheel unit with the integral blades milled out thereon from the blank of Fig. 13 by the methods and apparatus of the invention.

Fig. 15 is a detailed view in top plan of the ratchet and pawl and immediately associated elements of the indexing mechanism, showing particularly the indexing plate or disc with the circuit control switch arm and indexing detent or stop arm respectively associated with the indexing disc.

Fig. 16 is a detailed view in side elevation of the ratchet and pawl of the indexing mechanism and showing the mounting of the indexing plate or disc on the work supporting spindle.

Fig. 17 is a schematic view showing the basic electrical circuits and associated electrical instrumentalities and controlling switches therefor.

As a particular example of apparatus embodying the invention, we have selected a form thereof for automatically milling out from a preformed blank the integral blades or vanes to form from the blank a turbine or impeller wheel unit. However, this particular form of apparatus of the invention is not presented herein for purposes of limitation but primarily because in the production of such integral blade turbine or impeller wheels, the various problems and difficulties to which our invention is directed, are encountered in accentuated form. The invention is neither retsricted to the particular form of apparatus of this example nor to the milling out of integral blade turbine or impeller units for which the disclosed apparatus is particularly designed. Various forms of apparatus embodying the basic combinations and associations of organizations and components making up the invention, are adapted to and may be utilized for producing a variety of forms having integral member units, whether or not such integral members are of regular or irregular profile or contour, are arranged in a series of annular or circular form or along a straight line or irregular line path, or are generally peripherally or otherwise located on the unit. Apparatus of the invention are intended for and adapted to the automatic cutting or milling out of any form of integral members from a body or blank wherever such operations present general problems and difficulties as exemplified by those encountered in the production of the particular turbine wheel form of integral member unit of the present example, or wherever the use of such apparatus may be found to be desirable or expedient.

An integral blade turbine wheel unit W of a type which the apparatus of the present invention is particularly intended to produce by automatically milling out in a single cycle the complete series of integral blades thereof, is disclosed in Fig. 14. This turbine wheel unit W, in this instance, has the annular series of spaced, integral blades V thereof formed around the peripheral portion of one side of the wheel, concentric with the wheel axis, with the outer edges of each blade disposed substantially in the plane of the peripheral edge surface of the wheel. The wheel is formed with a hub H having an axial bore therethrough with this hub extended outwardly from the side of the wheel opposite that side on which the integral blades V are formed (see Fig. 10). The wheel unit W, referring now to Fig. 13, is formed from a preformed blank B which includes the hub H and an annular rib or flange V' extending from one side of the circular disc forming the body B around the periphery of the disc with the outer peripheral surfaces of this flange lying in the plane passing through the peripheral edge of the blank. The flange V' may as in the form illustrated have its outer surface bevelled or inclined radially outwardly to the peripheral edge of the blank.

The problem is to mill out from the flange V' of the blank B, the series of blades V integral with the blank to form the completed wheel unit W. In this instance, the blades V of the impeller wheel unit are each identical in contour or profile and thus in cross sectional shape, and are of a general airfoil shape in cross section with a relatively thick intermediate section terminating at the outer side in a relatively short leading edge and at the inner side thereof in a slightly thinner trailing edge portion as will be clear by reference to Fig. 14. Thus, these integral blades V of the turbine unit W of this example, conform generally in shape to the conventional "impulse" blades or buckets for turbine wheels. Such blades must be equally spaced apart on and around the wheel so as to form precisely identically dimensioned fluid flow and impulse passages therebetween and each of the blades must be spaced exactly the same distance from the axis of the wheel and each must itself be identical in contour, dimensions and location with each of the other blades of the series.

In accordance with the method of our invention, the turbine wheel blank B is held in accurate position relative to a rotary milling cutter C (see Figs. 3, 10 and 11) and this milling cutter is then moved into starting cutting engagement at the upper surface of the flange V' of the blank. From this position, the milling cutter is then caused to accurately move in cutting engagement with flange V' through an accurately determined path to cause the milling cutter to follow and precisely cut out and define the profile or contour of the first blade V of the series of blades to be milled out from the blank. The milling cutter is caused to cut out to a predetermined depth on each pass or complete movement around the contour or profile of the blank and the number of passes or complete cycles the milling cutter must make around the path of the blade contour will be dependent upon the depth of the cut on each pass and the final required depth or heighth of the blade. During the milling out of a blade V by a series of such cutting passes around the contour defining path through the flange V' of the blank, the milling cutter is progressively fed downwardly into the flange, although such progression may if desired be interrupted and a pass or several passes may be made without downward feed. For instance, in the production of the particular turbine wheel of this example, upon attaining the maximum depth for the blade, such progressive feed is arrested and a pass or passes of the milling cutter are made without feeding inwardly in order to efficiently clean out the bottom of the cut and accurately define the inner or bottom surfaces defining the space between adjacent blades. Similarly the method of individually milling out each blade of the series of blades, includes if desired for any particular blank being milled, the carrying out of one or more cutting passes through the blank at the start of the milling feed of each blade without inward feed of the milling cutter.

Upon completion of the milling out from the blank B, the first blade V of the series of integral blades of the wheel unit W, the blank B is then accurately repositioned to locate the blank relative to the milling cutter C for the milling out of the next adjacent blade of the series, which adjacent blade is then milled out in the identical manner hereinbefore described with respect to the milling out of the first blade of the series. These operations are then repeated blade by blade until the complete series of blades V have been milled out from the blank.

With the particular cross sectional shape and profile or contour of the blades V of the turbine wheel W of this example, it will be noted that the contours of the adjacent and facing sides of adjacent blades are different so that a milling cutter is employed of a character such that upon the milling out of each blade, only a portion of the material of the blank between adjacent blades is removed, the remainder of this material being removed by the milling cutter as it follows the contour path of and mills out each adjacent blade. However, our method is not essentially restricted to such steps where the form and profile of the blades may be such as to permit of removing on a single cutting pass the full width of material between the adjacent sides of adjacent blades.

The basic steps of the method of the invention are applied and carried out by the form of the apparatus of our invention illustrated herein as an example, for fully automatically milling out in a single operating cycle from the blank B, the completed integral blade turbine wheel W of the particular form as above described. Such apparatus in this instance happens to be based upon the general pantograph type of machine as exemplified by the standard types of pantograph engraving machines generally illustrated in the following United States Patents, namely, 1,790,581—January 27, 1931; 1,881,500—October 11, 1932; 1,925,036—August 29, 1933; and 2,000,838—May 7, 1935, in that, the example apparatus of our invention utilizes the general arrangement and association of the base and vertical column structure, the tracer controlled pantograph and the association thereof with the rotary cutter spindle mounted in the pivoted link supported cutter head universally laterally movable by the pantograph, the motor and belt type transmission therefrom to the universally laterally movable cutter spindle, and the work table and its supporting structure, of such standard types of pantograph engraving machines.

*General organization of the automatic apparatus*

Thus, the apparatus of the example, referring now to Figs. 1 and 2 of the drawings in particular, embodies the base supported vertical column structure 10 with the knee 11 for the work table 12 mounted on one side of such column structure 10 for adjustments in the position of the table 12 vertically and horizontally thereon.

A cutter head 14 is supported in position over and above work table 12 on the outer end of a supporting link structure generally indicated as 15 (see U. S. Patent 2,000,838, referred to above) for universal lateral movements of the cutter head in a horizontal plane. The supporting link structure 15 is pivotally mounted on and supported from a rigid, horizontally disposed arm structure 10a on the upper end of the column 10. A rotary cutter spindle unit 16 is mounted in cutter head 14 and includes the rotary cutter spindle 16a. Cutter spindle unit 16 is mounted in vertically disposed position in cutter head 14 for vertical sliding movements therein to lower and raise the unit with the cutter spindle 16a toward and from the work table 12. This spindle unit 16 is preferably spring loaded and is continuously biased in a direction to move the cutter spindle 16a from cutting relation with a work piece on the table 12, in accordance with the established practice for mounting the cutter spindle in the standard type of machine as generally exemplified in the U. S. Patents referred to above, and in such patents as Nos. 1,750,594—March 11, 1930 and 2,128,611—August 30, 1938.

A pantograph mechanism P is mounted in horizontally disposed position above the cutter head 14 and the spindle unit 16 mounted therein, pantograph P being pivotally hung or suspended in such position from a rigid supporting arm 10b mounted on rigid supporting arm structure 10a of the column structure 10. Pantograph P comprises the sets of parallel bars or links 2 and 4, and 3 and 6, respectively, and is pivotally mounted and suspended from arm 10b by a pivotal connection 10c between the arm 10b and a slider block 4a which is mounted on and slidably adjustably receives the pantograph link 4. The movement reducing bar or link 6 of pantograph P is pivotally coupled and connected with the upper side of the cutter head supporting link structure 15 by a slider block 6a pivotally mounted on structure 15 axially aligned above cutter spindle 16a, and which slidably adjustably receives therein and mounts the link 6 of the pantograph P.

The bar or link 3 of pantograph P is extended to provide the tracer arm T in axially aligned longitudinal continuation thereof, and this arm T mounts at its outer free end a tracer style unit S for scanning engagement with a pattern or master. Thus, movements of the style S in following a master, are transmitted to the pantograph P by tracer arm T, and such movements are in turn transmitted by the pantograph through link 6 thereof and the slide block 6a, to the cutter head supporting structure 15 and to the cutter spindle unit 16 in cutter head 14 as movements of the spindle 16a of such unit in accurately reduced scale to the movements of style S.

The cutter spindle 16a of the spindle unit 16, mounts a spindle driving pulley 16b thereon at the lower end thereof and a suitable belt drive is provided with includes a belt 17 engaged over and in driving relation with the spindle pulley 16b. The belt drive or transmission for spindle 16a may, as shown in the example hereof, be of the general types such as disclosed in the U. S. Patents Nos. 1,790,581—January 27, 1931, and 1,925,036—August 29, 1933, in which a motor 18 (see Fig. 1) is swingably mounted at the lower end portion of column structure 10 and drives the belt 17 from a pulley 17a through the medium of an arrangement of pulleys 17b and belt 17c, pulleys 17b and 17a being mounted on a horizontally swingable arm 17d, while the cutter head 14 is connected to the outer free end of arm 17d by a push-pull rod 17e (see Fig. 2). Thus, cutter spindle 16a of the unit 16 is in constant driving relation with the belt drive transmission from motor 18 in all positions through which the cutter head 14 and spindle unit 16 are universally laterally moved by the pantograph P.

The apparatus of my invention designed in accordance with the selected example for milling out from a blank the integral blades from a unit such as a turbine wheel, provides and includes in functional association and combination with the above pantograph mechanism and pantograph actuated and controlled cutter spindle, a power operated pattern or master organization generally identified by the reference character M, in Figs. 1, 2 and 3, in driving relation with the tracer style S for causing such style to follow under power an enlarged profile or master of each of the blades V of a turbine wheel; a power driven cutter spindle feed organization generally identified by the reference character F, which progressively feeds the cutter spindle toward the turbine wheel blank as the spindle is moved through a blade milling cycle to cause the milling cutter C carried thereby to define the profile or contour of each blade V being milled out of the blank; and a work supporting indexing organization generally identified by the reference character I, for supporting the wheel blank B in operative relation with a milling cutter C on cutter spindle 16a for moving the blank automatically upon the completion of the milling out of each blade V, to a position relative to the milling cutter for the milling out of the next adjacent blade V of the series of blades of the wheel W.

The association and functional inter-relationship between the power operated master organization M, the power operated spindle feed organization F and the work positioning and indexing organization I, combined with the universally laterallly movable cutter spindle unit 16 and the pantograph P, is such that the feed organization F has a single spindle feeding cycle which is fully automatically performed for and during the milling out of each integral member or blade V of the turbine wheel and which controls automatically the functioning of the index organization I to cause the latter to function to reposition the wheel blank during the period between the completion of the cycle of milling out a blade and the resumption automatically by the apparatus of the cycle of milling out the next adjacent blade. The indexing organization I has a single cycle through which it functions to position the wheel blank for each blade of the series of blades until the last blade of the series has been milled out, whereupon, such indexing organization functions automatically to stop the operations of the power operated spindle feed organization F and the power operated master organization M, so that the completed turbine wheel can be removed from the apparatus with the indexing organization I in condition to receive the next blank to be milled.

*Power operated master and movement transmitting organization*

The power operated master organization M, referring now to Figs. 4, 5, and 6, in connection with Figs. 1, 2 and 3, is mounted and positioned, preferably adjustably, on the upper side of the supporting column structure 10 and the arm 10a of such structure, at that side of the apparatus generally opposite the side at which the work table 12 is located. Such organization may, as in this example, include a horizontally disposed base structure 20 of generally rectangular outline having provided around its outer sides the continuous upstanding flange 20a. Base 20 is suitably rigidly fastened and secured to column structure 10—10a by means of a supporting bracket 20b mounted and attached on such structure. Threaded bolts 20c may be utilized for rigidly attaching base 20 to the bracket structure 20b, and if desired, the bracket structure may be mounted for adjustment relative to the column structure in order to permit of adjusting the position of the base 20.

A motor MM is provided for supplying the power for operating the power driven master unit M and movement transmitting mechanism or pantograph P. The motor MM is located at the under side of base 20, being mounted on and supported from a suitable bracket structure 20d at the underside of the base. This motor MM is mounted in generally horizontally disposed position at the underside of base 20 adjacent the outer or rear side thereof. Motor MM mounts at its inner side or end, a speed reduction unit 21 with which it is in operative driving connection. Speed reduction unit 21 is provided with an upwardly extended power output or take-off shaft 21a, in axial alignment with and being extended upwardly through a bore 21b formed through the bottom wall of the base 20. At the rear side thereof, base 20 is provided with a depending support plate 20d which mounts at the inner side thereof, a rheostat or current controlling element 22 for controlling the power circuit to the motor MM so that the speed of the motor and its power take-off shaft 21a may be selectively adjusted and set for the desired rate of speed of operation of the unit M. Rheostat 22 is provided with an operating knob 22a located at the outer side of the bracket plate 20d in position readily visible and accessible to the operator.

The power driven master unit M may be formed, referring now to Figs. 4 to 6, of the similarly shaped lower plate 23 and upper plate 24 secured together in parallel relation spaced apart by suitable fastening members such as the screws 25 having the spacers 25a thereon located between and positioning the plates relative to each other. The plates 23 and 24 are of generally rectangular shape or profile to accord with the shape of base 20 and are dimensioned to removably fit down into the space within the flange 20a with the lower plate 23 seated upon and removably secured to base 20. For instance, lower plate 23, referring to Fig. 5, may be secured to base 20 by cap screws or the like 23a having the headed upper ends thereof accessible through bores or openings 24a through the top plate 24.

The top plate 24 provides the pattern or master in the form of a pattern track forming slot G therein, which is an exact and precise enlarged scale replica of the contour or profile of the integral member, in this instance, the integral turbine blade V of wheel unit W which is to be milled out from the blank by the apparatus. This pattern track or slot G is formed by cutting out such track in the top plate as an endless slot positioned on and relative to the plate and to the working position of the blank B on the indexing mechanism I, so that, when the style S of the tracer arm T of the pantograph P is caused to move through and around such track, the milling cutter C will move through a path which is a scaled reduction of the pattern track and defines the exact profile or contour of each turbine blade to be milled out of the blank. As the pantograph P will transmit the movements of style S to milling cutter C, as reduced scale movements reversed in direction, the pattern track G is formed on pattern plate 24 with its position reversed to the position of each turbine blade to be reproduced therefrom on the wheel blank B. Thus, in this example, pattern track G is located so that the elongated reduced width portion of the track is located at the forward or inner side of unit M, by cutting an opening in the plate which opens through the edge of the plate and the adjacent portion of flange 20a of base 20, and mounting in such opening a block 26 which provides therein the curved end section or portion G' of the track. The portion 24b of plate 24 (see Fig. 2) which is surrounded by and confined within track G may be the portion of the plate cut therefrom by cutting out the track slot G, or such portion may be formed by a different piece of material. But in either case, the outer surrounding edge 24c thereof is formed and shaped to provide together with the inner edge 24d of the portion of the plate 24 which surrounds and defines the outer side of the track forming slot, the pattern track G as an enlarged replica of the contour or profile of the turbine wheel blade V.

The tracer style unit S at the outer end of tracer arm T depends from the underside of arm T into the pattern track or slot G. Such unit includes a stem S', referring now to Fig. 1, disposed with its axis perpendicular to the plane of movements of tracer arm T, which stem depends below the arm and is received in the pattern track forming slot G. The portion of style stem S' which extends into and is received in track G is of circular cross section and is accurately formed to provide a peripheral surface such that the style stem S' will be accurately guided in and along the track with minimum friction while maintaining the axis of style stem S' precisely located and positioned in the pattern track to cause tracer arm T to actuate pantograph P through the movements necessary to translate the cutter spindle C through a path which is an accurate reduced scale replica of the path defined by the pattern track.

An endless chain drive is provided for moving the style S and its stem S' in and around the endless pattern track G. In this instance, such drive embodies a roller link chain 30 mounted in the space between plates 23 and 24, below and following the shape or path of the pattern track G in such a manner that any point or location on the upper side of the chain may be moved under and along and in alignment with the slot forming the track. Such mounting may, as in the example hereof, be carried out by mounting the chain 30 over and extending between primary rollers 31, 32 and 33 located at points, respectively, along the inner side of the chain at which the major bights or turns thereof must be formed in following the pattern track G, and series of rollers 34 positioned along and engaged by the outer side of the endless chain, in such locations, respectively, as to cause the chain, together with the primary rollers 31, 32 and 33, to follow the desired path beneath and aligned with pattern track G. If desired, additional or supplementary rollers, such as the rollers 35 (see Fig. 2), may be located at strategic points at and engaged by the inner side of the chain. All of the rollers 31, 32 and 33 and the rollers 34 and 35, are mounted for rotation freely about suitable anti-friction bearings mounted on fixed stud shafts positioned between the upper and lower plates, as will be clear by reference to Figs. 4 and 5.

The inner roller 31 in this example, is mounted on the slide block 26 which closes the forward end of the track forming cut-out portion of pattern plate 24 and which together with roller 31, provides the curved end section G' of the track G. Roller 31 is mounted on an annular anti-friction bearing 31a, referring now to Fig. 6, the inner race of which is mounted on the upper end of a stud shaft 31b. This anti-friction bearing mounting typifies the mounting for the other endless chain confining and guiding rollers 32, and 33 and 34 and 35. Slide block 26 is slidably mounted and positioned on the lower plate 23 by means of the guideways 26a. The slide block 26 may, if desired, be mounted for adjustment of its position relative to the other chain confining and guiding rollers in order that the tension of the chain on and around these sets of rollers may be adjusted. For example, adjusting screws 26b may be threaded through block 26 for engagement at the inner ends thereof with plate 23 for adjusting the position of the block.

The lower or inner end length of the stem S' of style S, which extends down into the track slot G, is pivotally connected to a link of the chain 30, so that, as the chain is moved over and around its guiding and confining rollers, the style S is caused to move in and along track G in the direction of movement of the chain 30. The coupling or connection of style stem S' may be effected by providing an upstanding pin 30a on the chain 30 which is received in an axial bore 30b in the lower end of style stem S', as will be clear by reference to Fig. 6 of the drawings. In this manner, an effective pivotal coupling may be provided between the chain and the style stem of a character which will permit of the style stem S' being disconnected from the chain by merely lifting the style stem from the pin to remove the pin from the bore 30b.

The endless chain 30 is driven from the motor MM through the medium of a toothed sprocket wheel 36, mounted on the upper end of the power delivery or take-off shaft 21a of the motor speed reduction unit 21. Sprocket 36 is fixed on the upper end of shaft 21a, positioned between plates 23 and 24, so that, the sprocket teeth at the inner side of the sprocket engage with the links of the adjacent outer edge section of chain 30 as the chain is progressively fed by the sprocket between rollers 31 and 32. An inner side roller 35 is preferably located opposite sprocket 36 so as to support the chain at the point of power drive engagement of the sprocket therewith.

With the motor MM in operation, the endless chain 30 is thus continuously driven around its confining and guiding rollers to continuously move beneath and along the pattern track G in alignment therewith so that the style unit S is moved in and around the track and is guided and follows the enlarged scale replica provided by the track, of the profile or contour of the integral member to be milled out from a blank positioned on the indexing mechanism I. Movements of the style S through and around the path provided by the endless track G actuate the tracer arm T to operate pantograph P to cause the latter to move the cutter unit 16 and milling cutter C through an endless path which is an exact reduced scale replica of the pattern track G. The rate of speed at which tracer arm style S is caused to move around the endless path track G and the number of complete track cycles per unit of time which style S will make, are of course dependent upon the rate of speed of the motor MM, and such latter speed is variable under the selective control of the operator by means of the rheostat 22.

The power driven master unit provided by the plates 23 and 24 with the endless chain 30 mounted and positioned therebetween, is removable from mounted position on the base 20, by releasing the securing screws 23a, disconnecting style stem S' from the coupling pin 30a, and disengaging sprocket wheel 36 from the takeoff shaft 21a of the motor speed reduction unit 21. The removed unit may then be replaced by a similar unit. In this manner power driven master units having different pattern or master tracks G therein for different contoured members to be milled, may be interchangeably mounted on base 20.

*Power driven, automatic cutter spindle feed*

The cutter spindle unit 16 which is vertically slidably mounted in cutter head 14, is progressively fed to move the cutter spindle 16a thereof toward and into a work piece or blank B mounted on the indexing mechanism I during the milling out of each integral member such as the blade V from the blank B in the production of the completed turbine wheel unit W. This progressive feeding may include periods in which the feed of cutter spindle 16a into the blank is arrested, but the feed and arrestation of the spindle unit and the cutter spindle 16a thereof for each integral member or blade of the series of blades of the unit is carried out and performed in a single automatic cycle and such cutter spindle feeding cycle is repeated automatically for each blade of the series until the complete series of blades has been milled out from the bank.

The cutter spindle unit 16, as referred to hereinbefore, is spring loaded and is continuously biased in a direction to move spindle 16a and a milling cutter C thereon in a direction away from the work, and is only moved toward the work to place the milling cutter C in operative engagement with the work by the application of forces to the unit 16 which will overcome the spring loading. In this example, the outer or upper end of spindle unit 16 is provided with an upstanding member such as a pin 39 which is axially disposed relative to the unit and the depending cutter spindle 16a at the opposite end thereof, and which provides by its upper end the point at which feeding forces may be efficiently applied to the spindle unit to move it downwardly and inwardly through its mounting in the head 14 in order to move cutter spindle 16a and cutter C into operative engagement with the work piece.

Such automatic feeding of the cutter spindle in accordance with the principles of our invention, may be carried out by an organization such as that presented in the present example, in which a power driven cam member 40 is rotated with its cam surface 41 thereof continuously engaged by the upper end of the pin 39 of spindle unit 16, so that such pin functions as a cam follower under the action of the spring loading of spindle unit 16. Referring now to Figs. 10, 11 and 12, the cam member 40 is in the form of a circular disc having a peripheral flange 40a therearound at the inner or under side thereof, with the inner or peripheral edge of flange 40a providing the annular cam surface 41. Feed cam member 40 is mounted on the cutter head supporting linkage 15 in such position above cutter spindle unit 16 and the actuating pin 39 thereof, that cam surface 41 will be continuously engaged by pin 39 as the cam is rotated about an axis parallel with but radially offset from the vertical or longitudinal axis of cutter unit 16.

For instance in the specific apparatus hereof, the cutter head supporting link structure 15 is provided with an overarm 15a which extends over and across and is spaced from cutter head 14 and the outer or upper end of cutter unit spindle 16 and its actuating pin 39 (see Fig. 10). The feed cam 40 is mounted from this overarm 15a between such arm and the cutter spindle unit 16 on a stud shaft 42. This shaft 42 is mounted in fixed position on and extends inwardly from the overarm 15a with its longitudinal axis parallel with but radially offset a distance inwardly from the longitudinal axis of the cutter spindle unit 16 and actuating pin 39. The feed cam 40 is revolvably mounted and confined on the inwardly extended length of stud shaft 42 by a suitable annular antifriction bearing assembly 42a, such bearing assembly and the cam 40 being preferably removably mounted and confined in position by a nut member 42b, threaded on the inner end of shaft 42. The location and relative positioning of shaft 42 and feed cam 40 thereon, is such that the portion of the cam surface 41 above the pin 39 is aligned with that pin and engaged thereby. As the cam surface 41 is annular and concentric with the axis of cam 40 and its mounting shaft 42, it follows that as cam 40 is revolved, the annular cam surface 41 will continuously pass through the plane of the axis of pin 39 for constant engagement of the cam surface by the pin.

The feed cam 40 is power driven from a motor FM which in this instance, is mounted and supported from column structure 10 spaced a distance below the motor operated master unit M, as will be clear by reference to Figs. 1, and 3 of the drawings. Motor FM is controlable selectively as to the rate of speed of operation thereof through a rheostat 43 mounted on the column structure 10 above motor FM, such rheostat having an operating knob 43a in position readily accessible to the operator. A speed reduction unit 44 is driven from motor FM and provides a power output or take-off shaft 44a extending upwardly therefrom. Flexible shafting 45 is connected with the take-off shaft 44a and extends upwardly therefrom to the overarm 15a of the cutter head supporting linkage 15 for operative driving connection with the feed cam 40.

The feed cam 40, referring particularly to Fig. 11, is provided with a spiral gear or worm wheel 46 fixed thereon and therearound concentric with the cam axis at the side of the cam opposite cam surface 41, and a worm 47 is rotatably journalled in a casing 47a which is secured by means of a bracket structure 47b on the overarm 15a to position worm 47 tangentially relative to and in mesh with worm wheel 46 on feed cam 40. The worm 47 is coupled with and driven by the flexible shafting 45 from the motor FM to drive worm wheel 46 and thus revolve feed cam 40. The feed cam 40 and its drive transmission which includes the worm wheel 46 and worm 47, are mounted and supported on the universally laterally swingable cutter head supporting linkage 15 and are movable and maintained constantly in operative engagement throughout the movements of linkage 15, the flexible shafting 45 from motor FM to worm 47 freely permitting of such movements with a minimum of interference therewith.

The position of feed cam 40 relative to spindle unit 16 is such that the maximum outward or upward movement of cutter unit 16 which is permitted by any point on the annular cam surface 41, is less than the maximum outward movement possible to that unit, so that, the spring loading of the unit will act to effectively maintain the actuating pin 39 constantly biased into engagement with the cam surface.

The annular cam surface 41 is generated to lie in a generally helical or spiral path about the axis of the cam and its mounting shaft 42, from a point or sector on cam surface 41 which when in engagement with pin 39, permits cutter unit 16 to move upwardly or outwardly under its spring loading to remove the cutter C or cutter spindle 16 from cutting engagement with a blank B mounted on the indexing mechanism I, to a point or sector thereon at which the cutter spindle 16 is forced inwardly to position cutter C for its maximum depth of cut in a blank B. Referring to Fig. 11, the "low" point or sector on cam surface 41 at which cutter unit 16 is in position with the cutter C removed from operative engagement with the work is indicated at a, while the "high" point or sector on cam surface 41 at which the cutter unit 16 is forced inwardly to position the cutter at maximum depth of cut in the work is indicated at b. In the form of cam 40 shown, the points a and b on cam surface 41 are joined by a straight edge portion of cam flange 40a which is disposed in a plane substantially parallel with the axis of the cam. Hence, when pin 39 reaches point b on cam surface 41, further movement of the cam 40 to the right or in an anti-clockwise direction will cause pin 39 with cutter unit 16 to abruptly move from point b, outwardly or upwardly under the action of the cutter unit spring loading to engage pin 39 with the low point a of the cam surface and thus move cutter C from operative engagement with the work. From the "low" point or sector a thereof, cam surface 41 generally progressively spirals through a relatively flat spiral path around the cam, to the "high" point or sector b thereof. Cam 40 is designed to provide the annular cam surface 41 thereof for a complete spindle feeding cycle in one (1) revolution of the cam for the milling out of an integral member such as a blade V of the turbine wheel W.

The cam surface 41 of cam 40 for controlling automatically in a single cycle the spindle feed during the milling out of one of the blades V of the specific example hereof, is formed so that the "high" sector b thereof provides a "dwell" of the required number of degrees of the cycle to permit the milling cutter C under the action of the power operated master unit M to make one or more passes around the blade which has been milled out with the inward feed of cutter C arrested at the maximum depth of the blade. The sector of the cam surface 41 at such "dwell" is disposed in a plane perpendicular to the axes of the cam and the cutter unit feeding or actuating pin 39 so that movement of this "dwell" sector b of the cam surface in engagement with pin 39 will not result in inward feeding movement of cutter C. Similarly, a "dwell" of the required number of degrees for delaying initiation of feed of cutter C at the start of a blade milling cycle, may be provided of the required number of degrees through a sector on cam surface 41 beginning at the "low" point a thereof. The sector of cam surface 41 providing such dwell has the plane of the surface thereof perpendicular to the axes of the cam 40 and the spindle unit actuating pin 39. In this manner, the milling cutter C may be permitted to make one or more passes around the path of the profile of the blade to be milled out in order to provide a sufficient time interval within which the repositioning of a blank B may be effected by the indexing mechanism I prior to the commencement of the progressive feeding into the blank of the milling cutter C for the milling out of the next blade from the blank. If desired or found expedient, cam surface 41 may be provided with a "dwell" or "dwells" or other departures from the normal progressive spiral path of the cam surface 41, at any desired point or points thereon between low point a and high point b, in order to control the functioning of the cutter unit 16 to meet any particular conditions arising from integral member profile shaping, material, and such like factors which may be encountered in the milling out of integral members from a blank.

By the removable mounting provided for the feed cam 40, such a cam may be readily replaced by a cam of different characteristics for controlling the cutter spindle unit 16, so that, a wide range of cams may be made available for interchangeable mounting in the apparatus in order that the apparatus may be operated to mill out a wide variety of integral member units.

As will be explained hereinafter, the automatic cutter spindle feed mechanism controls automatically the functioning of the indexing mechanism I to reposition a blank B thereon for the milling out of the next blade upon the completion of the milling out of a preceeding blade of the series of blades. Such control of the indexing mechanism is effected through the medium of a micro switch 50 mounted on the outer side of the cutter head supporting link structure 15, adjacent the cutter head 14 thereof. Switch 50 has the actuating pin 50a thereof for opening and closing the circuit controlling contacts of the switch, positioned extending upwardly in vertically disposed position from the upper side of the switch. A lever 51 is pivotally mounted at 51a intermediate its ends on a vertical post 51b on structure 15, with the arm 51c of this lever extending over the upper end of cutter spindle unit 16 for engagement by that unit in the maximum raised position thereof, and with the opposite arm 51d thereof being extended over the outer end of switch actuating pin 50a for downward or inward rocking to operate such pin. Micro switch 50, referring now to Fig. 17, includes the fixed contact 52 and the movable contact 53 for opening and closing a circuit connected therewith. Movable contact 53 may be spring loaded and is normally maintained in circuit opening position out of engagement with contact 52. The movable contact 53 is actuated to circuit closing engagement with contact 52 by inward movement of the actuating pin 50a. Upon release of the inward acting pressures on pin 50a, movable contact 53 will return to circuit opening position disengaged from contact 52. When cutter unit actuating pin 39 moves from the high point b to engage with the low point a on cam surface 41, the cutter unit 16 moves outwardly into engagement with arm 51c of lever 51 and rocks arm 51d thereof to force the switch actuating pin 50a inwardly to position engaging contact 53 with the contact 52 to close a circuit through such contacts. As cutter spindle unit 16 is fed inwardly by the cam surface 41 from the low point a thereof in the cam cycle, cutter spindle unit 16 is forced inwardly from engagement with arm 51c of lever 51 and into positions spaced inwardly from and releasing such arm for swinging under the action of switch actuating pin 50a. Under such conditions the spring loading of switch contact 53 is released for functioning to disengage contact 53 from contact 52 to thus open the circuit through such contacts.

*Automatic work indexing mechanism*

The work indexing mechanism I for holding a blank B and for successively automatically indexing the blank from one blade milling position to the next blade milling position relative to the cutter spindle 16a and a milling cutter C thereof is mounted and positioned on the work table 12 below the cutter spindle unit 16. Such mechanism I includes a case 60 providing base flanges 60a by which the case with its mounted and contained mechanism may be secured in position on the work table 12 of the apparatus.

Referring to Figs. 7 to 10 inclusive, an arbor 61 is mounted and journaled in vertically disposed position in and extending through the upper wall of case 60 in a suitable bearing bushing 61a. Arbor 61 extends inwardly from the case upper wall a distance through the interior of the case 60. The outer end of arbor 61 is positioned at the outer side of the upper wall of case 60 and is provided with a disc or table 62 formed integral therewith. An axial bore 62a is formed through the disc 62 and extends a distance axially into the arbor 61 to provide a socket for receiving and mounting a work securing fixture 62b therein by which a blank B to be milled may be secured in position thereon for step-by-step rotation by and with the arbor 61 in operative cutting relation with a cutter C.

A disc 63 is journaled on the arbor 61 within case 60 below the top wall thereof for rotation on and independently of the arbor. The disc 63 may be journaled on and between spaced annular anti-friction bearings 63a confined and mounted between friction plate 63b at the underside of the top wall of the case 60 and an index unit assembly 64 keyed to the arbor 61 below the disc 63. Disc 63, referring to Fig. 7, is provided with the radially disposed index arm 65 extending from one side of the periphery of the disc, and a radially disposed actuating arm 66 extending from the opposite peripheral side of the disc in diametrical alignment with the index arm 65.

The index unit 64 includes a disc 77 mounted on a hub forming ratchet wheel 67 having conventional ratchet teeth 67a therearound. Ratchet 67 is mounted on the arbor 61 with the toothed portion thereof extending upwardly above disc 77 with the ratchet teeth 67a thereon positioned between that disc and the lowermost bearing of the bearing assembly 63a. Ratchet 67 is keyed to the arbor 61 and the disc 77 is keyed to the ratchet in order that rotation of the ratchet will result in rotation of the arbor and of the disc 77 of the index unit 64. The index unit 64 is yieldingly maintained in position on the arbor 61 by an expansion spring 64a mounted on the inner end of the arbor interposed and maintained under compression between nuts 64b threaded onto the end of the arbor and the adjacent inner side of disc 77 of the index unit.

A pawl 68 is pivotally mounted on a block 68a depending from the underside of disc 63 in position for engaging the teeth of the ratchet 67 for effecting step by step rotation of arbor 61 in one direction. Pawl 68 is continuously biased by a spring member 68b (see Fig. 7) mounted on depending member 68a. In this example, disc 63 is rotated step by step to the right or in a clockwise direction to rotate ratchet 67 and disc 77 of the index unit 64 which are keyed to arbor 61, in the same direction, that is clockwise, to thus rotate the arbor step by step in a clockwise direction.

In this instance, the number of ratchet teeth 67a may be considered as equal to the number of blades V making up the series of blades of the completed turbine wheel W, in that, it is intended that the indexing of the blank B from one blade milling position to the next through the complete cycle, shall be effected by engagement of successive teeth of the complete series of teeth 67a by the feeding strokes of pawl 68 through one complete revolution of ratchet 67. Fig. 15 of the drawings is to be taken as a diagrammatic disclosure of the arrangement of ratchet teeth 67a on ratchet 67, without regard or limitation to the specific number of teeth shown.

The pawl carrying disc 63 is actuated by a solenoid unit 70 mounted within case 60 with its armature 71 operatively coupled to the actuating arm 66 of pawl disc 63 through the medium of a yielding resilient coupling unit 71a connected at its rear end to the armature 71 and at its forward end pivotally coupled to the outer end of actuating arm 66 by a pivot member 71b. A contractile spring 72 is connected between the forward side of actuating arm 66 and the forward wall of case 60 by means of an adjustable connection 72a mounted in the wall and extending outwardly therethrough to provide a readily accessible adjusting head 72b by which the tension spring 72 may be adjusted by the operator. The solenoid 70 is normally de-energized and the spring 72 acts to retract or return disc 63 and solenoid armature 71 to normal inactive position after the rotation of the disc through a ratchet feeding stroke by energization of the solenoid 70. When the controlling circuit through solenoid 70 is closed and the solenoid is energized, its armature 71 is drawn rearwardly to rock or rotate disc 63 and move the pawl 68 to engage a tooth of the ratchet 67 and thus rotate or index the arbor 61 to move a work piece such as a blank B to its next position relative to cutter C. Actuation of disc 63 by energization of solenoid 70 places spring 72 under tension, so that, upon completion of the index stroke of armature 71 and de-energization of the solenoid 70, the spring 72 will rotate the disc 63 and retract the pawl 68 to position for engaging the next tooth of ratchet 67 on the next indexing stroke of solenoid 70.

The normal inactive or retracted position of the index arm 65 which determines and sets the retracted position of pawl 68 relative to the next tooth of ratchet 67 to be engaged thereby, is fixed by a variable position cam stop 73 located at the rear side of index arm 65, that is, the side toward which the arm moves in retracting, as will be clear by reference to Fig. 7. This cam stop 73 is mounted on the inner end of a shaft 73a which is mounted for rotation in and extending through a boss 73b on the inner side of the adjacent wall of case 60. Shaft 73a extends outwardly to the exterior of case 60 where it is provided with an adjusting nut 73c for rotating shaft 73a to adjust the position of cam stop 73. This cam stop 73 provides a peripheral stop surface which is eccentric to the axis of shaft 73a. Hence, by rotating the shaft 73a portions of the peripheral stop surface of cam stop 73 that are at different radial distances from the axis of the shaft, can be positioned in line with arm 65 for engagement therewith to thus selectively vary the retracted position of the arm.

At the forward side of arm 65, a stop rod 74 is mounted extending inwardly of the forward wall of case 60 in line with index arm 65 for engagement by the forward edge of that arm. This stop rod 74 is mounted in the case wall for movement longitudinally to adjusted positions relative to the index arm 65 so as to permit of varying the extent of the active or indexing stroke of arm 65 upon rotation of disc 63 by the indexing stroke of armature 71 of solenoid 70. Stop rod 74 determines the degree of clockwise rotation of arbor 61 by limiting the indexing stroke of pawl 68, and hence determines and fixes the degree of rotation of a blank B mounted on the arbor and the position to which such blank is indexed relative to cutter C. Such indexed position must be accurate and must be maintained without deviation during the cycle of milling a blade from the blank.

In the example hereof, the circular disc or plate 77 is keyed for rotation with arbor 61 and provides the indexing plate of the indexing unit 64. This indexing plate 77 is formed with a series of arbor positioning indexing recesses or notches 76 formed in and completely around the peripheral edge portion of the plate. The indexing notches 76 are adapted to successively seat and engage therein an indexing plunger or pawl 75 as the indexing plate 77 is rotated step by step by the ratchet 67 to successively move a turbine wheel blank B mounted on arbor 61 to blade milling positions relative to cutter C. The indexing pawl 75 seats in each indexing notch 76 and releasably engages and holds the indexing plate 77 in the indexing position defined by such notch, during the blade milling out operation until completion of that operation and the next partial rotation of the indexing plate 77 by the ratchet 67 to move the plate to position with the indexing pawl releasably engaged in the next indexing notch 76.

The indexing plunger or pawl 75 may be formed by an arm pivotally mounted on a boss 77a on the inner side of the forward wall of case 60 with such arm extending at the forward side of the peripheral edge of disc 77 in which the series of indexing notches 76 are formed therearound. A roller 77b is mounted on the inner side of the end of pawl forming arm 75 for rolling engagement with the notched peripheral edge of disc 77. An expansion spring 77c is positioned between a spring tension adjusting member 77d mounted in the forward wall of case 60 and the outside of the inner end of pawl 75, for continuously biasing the pawl toward index plate 77 to maintain roller 77b in constant rolling engagement with the notched peripheral portion of the plate. Member 77d is accessible at the exterior of the case 60 for adjustment to vary the tension of spring 77c.

In the foregoing manner, the indexing plunger 75 seats and engages the roller 77b thereof under the biasing action of spring 77c, in an indexing notch 76 to releasably hold and maintain arbor 61 in a blade milling position against the forces exerted on arbor 61 by a blank B thereon during a blade milling operation by the milling cutter C. Upon the completion of the milling out of the blade, arbor 61 is then rotated through a partial revolution by ratchet 67 which causes the indexing plunger 75 to be forced out of seated engagement in the indexing notch 76 for the completed blade operation and to snap into seated engagement in the next indexing notch 76 to thus accurately position the indexing plate 77 for the milling out of the next turbine blade V on the blank B on arbor 61. Such step by step rotation through partial revolutions of the arbor 61 continues through one complete revolution of the arbor and the indexing plate 77 with each partial revolution positioning an indexing notch 76 of indexing plate 77 for releasable, indexing plate holding engagement therein of the indexing roller 77b of plunger 75 to thus successively index a blank B on arbor 61 through the blade milling positions thereof for a complete turbine wheel milling cycle of one (1) revolution of indexing plate 77.

The indexing plate 77 is provided at its outer or upper side with an annular, upstanding flange 78 therearound, concentric with arbor 61, but spaced inwardly from the outer peripheral edge of the plate. A trip pin 79 is mounted in fixed position in flange 78 and projects a distance radially outwardly from the outer peripheral side surface of the flange. This trip pin 79 is mounted in a definite position relative to that indexing notch 76 of plate 77 which is engaged by roller 77b of indexing plunger 75 when the indexing plate is in its starting position following the completion of the milling out of the last blade V of the series of blades of a turbine wheel W. In Fig. 15, such starting position indexing notch 76 is shown with the roller 77b engaged therein, the trip pin 79 being spaced a predetermined number of degrees around flange 78 from starting index notch 76 in an anti-clockwise direction relative to the clockwise direction of rotation of disc 77 and flange 78.

A micro switch 80 is mounted within case 60 adjacent the forward wall thereof and includes the usual switch actuating pin 80a for actuating the switch contacts. Actuating pin 80a extends outwardly to the exterior of switch 80 at the inner side thereof, as will be clear by reference to Fig. 7. Micro switch 80, referring now to Fig. 17 of the drawings, includes the fixed contacts 81 and 82 and the movable contact 83. Fixed contacts 81 and 82 are spaced apart and adapted to be selectively alternately engaged by the movable contact 83. In this instance, micro switch 80 may be considered to be of the "snap" type in that movable contact 83 when moved into engagement with either contact 81 or 82 will be yieldingly held in an engaged position until forced therefrom into the alternate engaged position.

A spring arm 80b is fixed at one end thereof on the inner side of switch 80 and extends inwardly therefrom across and engaged with the outer end of switch actuating pin 80a to a position with its outer end adjacent flange 78 of disc 77. A roller 80c is rotatably mounted on the outer end of arm 80b and is maintained in constant rolling engagement with the outer side peripheral surface of the flange 78 by the spring characteristics of arm 80b which function in a manner to yieldingly maintain the roller in engagement with the flange. With roller 80c in normal engagement with the peripheral surface of flange 78, arm 80b is sprung outwardly and maintained in position releasing pin 80c for outward movement thereof to position with contacts 83 and 82 engaged. However, upon engagement of roller 80c by the trip pin 79, arm 80b is momentarily forced to swing outwardly from the peripheral surface of the flange and to thereby apply to pin 80a inwardly acting forces of a magnitude to snap movable contact 83 from engagement with fixed contact 82 to open a circuit therethrough, and into engagement with the fixed contact 81 to close a circuit through engaged contacts 83 and 81.

Switch 80 is provided with a manually operable reset plunger 85 slidably mounted in and extending through the forward wall of case 60 in position for operative engagement with a reset pin 80d located at the forward side of the switch within the case, as shown by Fig. 7. The outer end of reset plunger 85 is provided with a knob 85a at the exterior of the case and an expansion spring 85c is interposed between such knob and the adjacent wall of the case to maintain the plunger 85 in outwardly biased position relative to switch pin 80d. Thus, when actuating pin 80a is forced inwardly to engage contact 83 with contact 81, reset pin 80d is forced outwardly into position for engagement by inward movement of plunger 85 to reset the switch by forcing movable contact 83 from engagement with contact 81 and into engagement with contact 82.

At one side of case 60, a signal light assembly 86 is provided which is included and connected in a circuit controlled from the operating circuits of the apparatus in such a manner as to be lighted by the closing of its circuit upon the completion of the turbine wheel milling cycle, as will be explained hereinafter. Such signal light 86 is shown in Figs. 1, 3 and 7 in particular, while the circuit therefor is shown in the circuit diagram of Fig. 17.

A main control switch 87 is mounted in a wall of case 60 at the opposite side of the case from reset plunger 85 of micro switch 80, and is connected in and controls the power supply circuit for motors MM and FM, solenoid 70, and the signal light 86, as will be explained in connection with the control circuits of the circuit diagram of Fig. 17.

Control circuits

A diagram of the control circuits for the apparatus of the example, is shown in Fig. 17. Such circuits include a power supply circuit comprised of the conductors or lines 90 and 91 which are connected to a suitable source of power, say for example, a source of 110 volt, alternating current. Power supply line 90 is connected to movable contact 83 of micro switch 80 while supply line 91 is connected to the terminal 87a of the main control switch 87. Contact 81 of micro switch 80 is connected by a line 92 to one terminal of the signal lamp assembly 86 and the other terminal of such lamp assembly is connected by line 93 to line 98 and through switch 87 to supply line 91. Thus, a circuit through the lamp assembly is completed from supply line 90 back to supply line 91 with main switch 87 closed and contacts 81 and 83 of micro-switch 80 in engaged circuit closing position. One terminal of solenoid unit 70 is connected with the supply line 90 by the line 94 and micro switch 50 with its contacts 52 and 53 connected in the line 94. The other terminal of solenoid unit 70 is connected with the other supply line 91 by the lines 93 and 98 and the switch 87 in line 93. Thus, an energizing circuit through solenoid 70 is completed with main switch 87 closed and contacts 52 and 53 of micro-switch 50 in engaged, closed position.

Fixed contact 82 of micro switch 80 provides a common line 95 to one side of the motors FM and MM. From line 95a, branch line 96 leads to and is connected throuugh motor FM back to line 93, while another branch line 96 leads from the line 95 through motor MM and back to line 93 through the line 97.

The circuits are completed back to the other supply line 91 through main control switch 87 by line 98 which connects line 93 with the terminal 87b of the main switch 87.

With main switch 87 closed and with contacts 82 and 83 of micro switch 80 engaged, the circuits through the motors FM and MM are closed for operation of such motors. A circuit through solenoid unit 70 may then be closed and opened by engaging and disengaging contacts 52 and 53 of micro switch 50. A circuit through the signal 86 may be closed by engaging contacts 81 and 83 of micro switch 80 whch necessitates disengaging contacts 82 and 83 to thereby simultaneously open the circuits through motors FM and MM, and through solenoid unit 70 so that such motors and solenoid unit are rendered inactive.

The circuit forming conductors or lines as above described may be contained in suitable flexible conduits extending from a distribution point 100 (see Fig. 3). A conduit 101 may extend from point 100 up to micro switch 50 on the cutter head supporting linkage 15, with branches 101a and 101b therefrom for carrying the circuit conductors to the solenoid 70, micro switch 80, light assembly 86, and main switch 87 mounted on the case 60 of indexing mechanism I. A conduit 102 may lead to and contain the lines for supplying current to motor FM, while a conduit 103 and necessary branches thereof may contain and carry the lines to motor MM.

*Operation*

In order to condition for operation an apparatus of the example herein illustrated and described, the main switch 87 is first moved to a position closing contacts 87a and 87b thereof to thereby close the control circuits of the apparatus for operation. The micro switch 80 will then be in position with contact 83 disengaged from contact 82 and the circuits open to master motor MM, spindle feed motor FM and the solenoid 70 of the indexing mechanism I, switch 80 having been actuated to such position automatically upon the completion of the preceding turbine wheel milling cycle of operations of the apparatus.

The spindle unit 16 will have moved automatically upon the completion of the preceding operating cycle to position with cutter spindle 16a and cutter C thereon elevated or removed outwardly from blank engaging and cutting position. This position was effected at the end of the cycle of operation of the feed cam 40 by the pin 39 of spindle unit 16 moving the high point b of cam surface 41 to the low point a thereof, accompanied simultaneously by the opening of the circuits to motors FM and MM to stop operation thereof with spindle 16 remaining in this position for the start of the next cycle of operations. And in assuming this position, lever 51 will have released pin 50a to permit the movable contact 53 to move from engagement with contact 52 of micro switch 50.

The work supporting arbor 61 is in position with the roller 77b of pawl 75 engaged in recess 76 of the index disc 77, so that this disc and the arbor are in starting position. A blank B is then mounted in fixed position on arbor 61 by means of the blank holding fixture 62b. After the blank B is positioned on the arbor, the operator then forces reset plunger 85 inwardly which resets micro switch 80 to operating position with the contact 83 disengaged from contact 81 and engaged with contact 82 to close the circuits through and to thereby start operation of master motor MM and feed motor FM, as well as to close the circuit through the indexing mechanism solenoid 70.

Operation of motor MM drives the power operated master mechanism M to move tracer style S of the pantograph mechanism around and guided in the endless master track G to thereby actuate the pantograph P to cause movements of the cutter head 14 with spindle unit 16 and the milling cutter C thereof in accurately reduced scale through a path precisely following and defining the contour of a turbine blade V to be milled out from the blank B. Simultaneously, with the start of operation of the power driven master mechanism M, motor FM starts the drive of feed cam 40 through its feeding cycle. If the low point a of cam surface 41 is formed to provide a sector having a degree of dwell in the direction of cam rotation, then the milling cutter C may make one or more passes around the path of blade contour before being fed into cutting engagement with that portion of blank B which is located by the indexing mechanism at the cutting station.

When the feeding section of cam surface 41 is reached, then cutter unit 16 and the cutter C thereon are progressively fed into the blank as the cutter C is moved by the pantograph P through and around the blade profile or contour. Such feeding of the cutter spindle and its milling cutter C continues until the blade V being milled out has attained the desired depth at which point feed cam 40 will have completed its cycle of one revolution and the high point or sector b thereof will have been rotated into engagement with pin 39 of the spindle unit 16. Preferably, as referred to hereinbefore, the high point b of cam surface 41 is formed to provide a "dwell" of the required number of degrees to permit of the cutter spindle and cutter C being moved through one or more passes with inward feed arrested, prior to pin 39 reaching the end point of sector a and then moving automatically outward into engagement with the low point a which forms the starting point for the next milling cycle.

The rate of speed of operation of master motor MM is selectively manually controllable by the rheostat 22, and such control is independent of the control of the rate of speed of operation of the feed motor FM by the manual control of rheostat 43 for the latter motor. Hence, the number of complete trips tracer style S makes around the endless master track G and the resulting number of passes the milling cutter C makes around the blade being milled out on blank B, depends upon the relative speeds for which motors MM and FM are adjusted and set. The number of passes required of the milling cutter C in order to mill out a complete blade will of course vary and be dependent upon the depth of cut which the milling cutter is caused to make under the control of the feed cam 40 for each pass which the cutter makes around the blade. The rate of speed of revolution of feed cam 40 relative to the rate of speed of operation of the power driven master M, is such that when feed cam 40 approaches the completion of one revolution and the cutter unit feed pin 39 has reached high point or sector b on cam surface 41, the milling cutter C will have made a sufficient number of milling passes around the blade being milled to have cut or milled out the blade to the maximum depth required.

Continued rotation of feed cam 40 to complete one revolution will move the low point or sector a on cam surface 41 opposite pin 39, whereupon under the action of the spring loading of cutter spindle unit 16, such unit with pin 39 will move instantly outwardly to position with pin 39 engaged with the low point a and the unit 16 moved bodily outwardly to remove or lift cutter C from cutting engagement with blank B. Thus, a blade V will have been completely automatically milled out by the milling cycle controlled by the single revolution of feed cam 40.

As cutter spindle unit 16 moves outwardly to non-cutting position of cutter C, it engages the actuating lever 51 of micro switch 50, so that, simultaneously with the outward movement of unit 16 for engagement of pin 39 with cam low point a, movable contact 53 of switch 50 is moved into engagement with contact 52 and the solenoid unit 70 of the indexing mechanism I is energized to actuate the armature 71 thereof of an indexing stroke. Armature 71 actuates pawl 68 to engage a tooth of ratchet 67 of the indexing unit 64 and arbor 61 is rotated thereby through a partial revolution, the extent of which is determined by the stop rod 74, to rotate blank B in a clock-wise direction to position the blank relative to cutter C for milling out the next blade V of the series of blades of the turbine wheel W. During this indexing step, the feed cam 40 is being continuously driven, and, dependent upon the extent of any "dwell" provided by the low point or sector $a$ of cam surface 41, will have partially revolved until pin 39 of spindle unit 16 is engaged with and has started upon the spindle feeding or inward camming portion of surface 41 to initiate feeding movement. The initiation and progressive inward feeding of spindle unit 16 as it starts upon the next cycle of blade milling operations, forces unit 16 inwardly and releases switch actuating lever 51 so that movable contact 53 of the switch snaps to position disengaged from contact 32, thereby opening the circuit through and de-energizing solenoid 70. Spring 72 of the indexing mechanism then returns or retracts disc 63 and the indexing arm 65 thereof to position to engage upon the next indexing stroke the next tooth of the teeth 67$a$ of the ratchet wheel 67.

The apparatus then repeats automatically the foregoing operations to mill out from the blank B the next blade V. Such automatic blade milling operations are continued blade by blade, with the feed cam 40 automatically going through and completing its cutter feeding functions with the power driven master mechanism M continuously operating at the selected rate of speed so as to cause the cutter C to make the requisite number of cutting passes for each feeding cycle of the feed cam.

Upon the completion of the last blade V of the series of blades, of the turbine wheel W, the indexing mechanism I will have indexed the blank B step by step for milling out the blades V, blade by blade, until the disc 77 of the indexing unit 64 has completed one revolution, at which time trip pin 79 will engage and revolve past roller 80$c$ of actuating arm 80$b$ of the micro switch 80, and will force said arm momentarily inwardly to engage switch actuating pin 80$a$ to move contact 83 of the switch out of engagement with contact 82 to break or open the circuits through master motor MM, feed motor FM, and the solenoid unit 70, so that the master and feed motors are stopped and the operations of the pantograph and of the feed cam are arrested. As trip pin 79 moves from engagement with roller 80$c$, the detent roller 77$b$ of positioning pawl 75 drops into the recess 76 of disc 77 to position and hold the indexing mechanism in completed cycle position ready for the start of the milling operations for the next blade B mounted on the arbor 61 of the indexing mechanism I.

Upon actuation of micro switch 80 by the arm 80$b$ at the completion of the wheel milling cycle, movable contact 83 of switch 80 is not only moved from engagement with contact 81 to open the circuits to the motors MM and FM but is also moved into engagement with the contact 82 to thus close the circuit through the light assembly 86 to cause illumination of the signal light of that assembly and thus provide a visible signal to the operator that the turbine wheel has been completed. The completed wheel may then be removed from arbor 61 of indexing mechanism I and another blank B mounted in position on the arbor for the milling out of the blades V therefrom in accordance with the operations as hereinbefore explained.

The turbine wheel W used as an example of blade milling operations which can be automatically performed in accordance with the method and by an apparatus of our invention, happens to be of the type in which the blades V thereof are formed around one side of the wheel W adjacent the wheel periphery. However, our invention is not restricted to the milling out of such side blades but contemplates and includes operations to mill out blades of a turbine wheel of the type in which the blades are formed from and on the periphery disposed generally radially of the wheel. Such types of turbine wheels are familiar and well known in the turbine wheel art. In milling out such peripheral types of blades from a blank, the wheel blank instead of being mounted on indexing mechanism I with its axis aligned with the axis of arbor 61 and disposed parallel with the axis of the cutter spindle 16$a$, is mounted on the indexing mechanism in a position 180 degrees from the mounted position of blank B of the present example, and with the axis of the blank perpendicular to the longitudinal axis of the cutter spindle 16$a$. In such mounting, the blank is rotated step by step by the indexing mechanism through a vertical plane to successively position the peripheral portion thereof relative to a cutter C on the cutter spindle for the milling out blade by blade of the series of blades around the periphery of the blank.

It will also be evident that various other embodiments, mechanical expressions, constructions, combinations, and subcombinations than those exemplified by the illustrated and described examples hereof, may be resorted to without departing from the broad spirit and scope of our invention, and hence, we do not desire or intend to limit our invention to the exact and specific disclosures hereof, except as may be required for specific intended limitation thereto in any of the appended claims.

What we claim is:

1. In combination, power operated means for indexing a work piece thereon step by step to successively position portions of the work piece at a cutting station; a cutter spindle mounted for lateral movements over the cutting station of said indexing means and being adapted to mount a cutting tool, said cutter spindle being also mounted for axial movements thereof toward and from the cutting station between a non-cutting position with a cutting tool relative to a work piece to a position fed into the work piece to the maximum depth of cut therein; power driven spindle feeding mechanism connected with said cutter spindle for feeding said spindle during lateral movements thereof from non-cutting position to position with a cutting tool at the maximum depth of cut in the work piece; means for returning said spindle from its position of maximum depth of cut to its non-cutting position; and means actuated automatically by movement of the cutter spindle to its non-cutting position for causing operation of said indexing means to index the work piece to position the next portion thereof at the cutting station.

2. In combination, electrically operated means for indexing step by step a work piece mounted thereon to successively position portions of the work piece at a cutting station; an electrical control circuit for said indexing means; a cutter spindle mounted for lateral movements over the cutting station adapted to mount a cutting tool, said cutter spindle being also mounted for axial movements thereof toward and from the cutting station between a position with a cutting tool at maximum depth of cut in a work piece and a non-cutting position with the tool removed from the work piece; power driven spindle feeding mechanism connected with said cutter spindle for feeding said spindle during lateral movements thereof from non-cutting position to position with a cutting tool at maximum depth of cut in the work piece; means for returning said spindle from its position of maximum depth of cut to non-cutting position; and means actuated automatically by a movement of the cutter spindle from its inwardly fed position of maximum depth of cut to non-cutting position for conditioning the control circuit to said indexing means to cause operation of the latter means to index a work piece thereon to position the next portion of the work piece at the cutting station, said means for conditioning the controlling circuit of said indexing means being arranged to be rendered inactive upon the initiation of the next inward feeding movement of the cutter spindle by said spindle feeding mechanism.

3. In combination; work mounting means; a cutter spindle supporting structure mounted for universal lateral movements; a cutter spindle mounted on said structure and being universally laterally movable thereby over a work piece on said mounting means; said cutter spindle being also mounted on said structure for movements axially toward said mounting means; a power driven master unit; a fixed support member intermediate said master unit and said spindle supporting structure; a movement transmitting linkage pivotally supported on said fixed support member and operatively coupling said master unit with said spindle supporting structure for imparting movements to the latter structure to move said cutter spindle laterally over a work piece on said mounting means in scaled reproduction of the movements imparted to said mechanism by said master unit; and a power driven spindle feeding mechanism mounted on and movable with said spindle supporting structure in operative connection with said cutter spindle for progressively feeding said spindle toward a work piece during universal lateral movements of the spindle by said movement transmitting mechanism.

4. In combination, a cutter spindle supporting structure mounted for universal lateral movements; a cutter spindle adapted to mount a cutting tool; said cutter spindle being mounted on said structure and being laterally universally movable thereby over a work piece; said cutter spindle being also mounted for movement axially toward and from a work piece; a master unit including a master profile, a tracer element mounted for movement to follow along said master profile, and power means connected with with tracer element for moving said element along the master profile; movement transmitting mechanism operatively coupling said tracer element with said spindle supporting structure for imparting movements laterally to said spindle and a cutting tool in scaled reproduction of the movements imparted to said mechanism by said tracer element; cutter spindle feeding mechanism mounted on and movable with said universally laterally movable spindle supporting structure in operative connection with said cutter spindle for moving said cutter spindle axially to progressively feed a cutting tool into a work piece during lateral movements of a cutting tool through the work piece by said movement transmitting mechanism; and power means connected with said feeding mechanism for driving the mechanism.

5. In combination, electrically controlled means for indexing a work piece step by step to successively position portions thereof at a cutting station; a cutter spindle supporting structure mounted for lateral movements; a cutter spindle adapted to mount a cutting tool; said spindle being mounted on said supporting structure and being laterally movable thereby to move a cutting tool laterally through a work piece at the cutting station; said cutter spindle being also mounted on said supporting structure for movements axially toward and from the cutting station between a position with a cutting tool at its maximum depth of cut in and a position removed from cutting engagement with a work piece at the cutting station; power driven feed mechanism connected with said cutter spindle and being mounted on and movable with said supporting structure for moving the spindle axially to progressively feed a cutting tool into a work piece during lateral movements of said cutter spindle and tool by said supporting structure; means under the control of said feeding mechanism for causing movement of said cutter spindle to withdraw a cutting tool from the work piece upon completion of the feed of a tool by said spindle to maximum depth of cut into the work piece; electrical control circuits for said indexing means; a switch unit mounted on said spindle supporting structure in electrical association with said control circuits; and mechanism actuated automatically by said cutter spindle on the return movement of the spindle to position with a cutting tool removed from the work piece for actuating said switch unit to condition the circuits to effect operaion of said indexing means to index the work piece.

6. In combination, power operated indexing mechanism for indexing step by step a work piece mounted thereon to successively position portions of the work piece at a cutting station, said mechanism including, intermittently operable power means for actuating the indexing mechanism step by step, and control means for effecting operation of said power means; a cutter spindle adapted to mount a cutting tool; said spindle being mounted for universal lateral movements to move a cutting tool in lateral cutting engagement through a work piece to cut out an integral member from the work piece; said cutter spindle being also mounted for movements axially toward and from the cutting station between a position with the cutting tool at a maximum depth of cut in a work piece and a position removed from the work piece in non-cutting relation therewith; a power driven master unit including, a master profile constituting a scaled reproduction of the profile of an integral member to be cut from the work piece, a tracer element mounted for movement to follow along said master profile, and power means for moving said tracer element along the master profile; movement transmitting mechanism operatively coupling said tracer element with said cutter spindle for moving said spindle with a cutting tool in cutting engagement laterally through a work piece in scaled reproduction of the movements imparted to said mechanism by said tracer element; power driven spindle feed mechanism connected with said cutter spindle for moving said spindle toward a work piece at the cutting station to progressively feed a cutting tool into the work piece during lateral cutting movements of the spindle and tool to cut out the integral member, said feeding mechanism including, means for arresting feed of said spindle when a cutter reaches a predetermined depth of cut and for releasing automatically the spindle from feeding connection with said feed mechanism for return movement of the spindle to non-cutting position; means operative by release of the spindle by said feeding mechanism for returning the spindle to non-cutting position; and means actuated automatically by said cutter spindle upon return movement of the spindle to non-cutting position for effecting actuation of the power means of said indexing mechanism to cause operation of the latter mechanism to index a work piece.

7. In combination, a work support; a cutter spindle mounted for universal lateral movements over said work support and being adapted to mount a cutting tool at the work support end thereof; said cutter spindle being also mounted for movements axially thereof toward said work support; a master unit including a profile master, a tracer element mounted for movement to follow along said profile master, and power means connected with said tracer element for moving the element along said profile master; pantograph mechanism operatively coupled between said tracer element and said cutter spindle for transmitting movements to the cutter spindle in scaled reproduction of the movements of said tracer element; cutter spindle feed mechanism connected with said cutter spindle for moving the spindle toward the work support to progressively feed a cutting tool into a work piece on said support during universal lateral movements of the cutting tool through the work piece by the cutter spindle; and power means connected with said feed mechanism.

8. In the combination as set forth in claim 7, independently operable control means for the tracer element power means and for the cutter spindle feed mechanism power means, respectively, for independently selectively controlling the rates of speed of movement of the tracer element and the rate of feed of the cutter spindle.

9. In apparatus for cutting out by a rotary cutting tool an integral member from a blank, in combination; work holding means adapted to mount a blank at a cutting station; a rotary cutter spindle mounted for universal lateral movements over the cutting station, said spindle adapted to mount a rotary cutting tool for movements laterally by said spindle in cutting engagement with the portion of a blank at the cutting station; said spindle being also mounted for movements axially toward and from the blank at the cutting station; a power driven master unit including, a profile master providing an endless track constituting a scaled reproduction of the profile around the integral member to be cut from the blank, and powered transmission mechanism connected with said element for continuously moving the element around said endless profile track; pantograph mechanism operatively coupled between said tracer element and said cutter spindle for continuously moving said spindle with a tool laterally through a cutting path; power driven spindle feed mechanism connected with said cutter spindle for moving the spindle axially from non-cutting position toward the cutting station for progressively feeding a tool into a blank during lateral movements of the tool; means operatively associated with said feed mechanism for disconnecting the cutter spindle from the feed mechanism to arrest feed of the spindle when the cutter reaches a predetermined depth of cut; means connected with the spindle for returning the spindle to non-cutting position when disconnected and released from the feed mechanism; means for reconnecting the spindle with the feed mechanism when the spindle returns to non-cutting position for the initiation of another feed cycle; and power means connected with said spindle feed mechanism for driving said mechanism to effect feed of the spindle.

10. In combination, power actuated indexing mechanism for indexing step by step a work piece mounted thereon to successively position portions of said work piece at a cutting station for the cutting out on said portions of a series of integral members, respectively, said indexing mechanism including, normally inactive power means for operation to actuate said mechanism to effect an indexing step, and control means connected with said power means for operation to effect actuation of said indexing mechanism; a cutter spindle adapted to mount a cutting tool; said cutter spindle being mounted for universal lateral movements to universally laterally move a cutting tool over the cutting station; said cutter spindle being also mounted for axial movements thereof toward and from the cutting station between a position with a cutting tool at maximum depth of cut in the work piece to a position with a cutting tool removed from the work piece; a power driven master unit including, a master profile constituting a scaled reproduction of the profile of each integral member of the series of members to be cut from the portions of the work piece successively positioned at the cutting station; a tracer element mounted for movements to follow along said master profile, and power means for moving said tracer element along the master profile; movement transmitting mechanism operatively coupled between said tracer element and said cutter spindle for moving said spindle with a cutting tool laterally in scaled reproduction of the movements imported to the movement transmitting mechanism by said tracer element; power driven spindle feeding mechanism connected with said cutter spindle for moving the spindle axially toward the cutting station to progressively feed the cutting tool into a work piece during lateral cutting movements of said spindle and tool; means for arresting automatically movement of the cutter spindle to feed a cutting tool into the work piece when the cutting tool reaches a predetermined maximum depth of cut; means for releasing the cutter spindle from feeding connection with said feed mechanism for return of the spindle and cutting tool to non-cutting position when feed of the cutter spindle is arrested; means for operative engagement automatically by said cutter spindle upon the return movement of the spindle to cause operation of said indexing mechanism power means; and means connected with said indexing mechanism adapted to be operated thereby to stop operation of said power driven master unit and said power driven spindle feeding mechanism upon the completion of the last integral member to be cut out from the work piece.

11. In combination, power actuated indexing mechanism for indexing a work piece step by step to successively position portions of the work piece at a cutting station for the cutting out on said portions of a series of integral members, respectively; said mechanism including normally inactive power means connected therewith for operation to actuate said mechanism, and control means operable to effect operation of said power means; a cutter spindle mounted for universal lateral movements over the cutting station and being adapted to mount a cutting tool; said cutter spindle being also mounted for axial movements thereof toward and from the cutting station between a position with a cutting tool at maximum depth of cut in a work piece and a position removed from the work piece; a power driven master unit including, a tracer element mounted for movement along a path constituting a scaled reproduction of the profile of each of the integral members to be cut from the work piece, and power means for moving said tracer element; movement transmitting mechanism operatively coupling said tracer element with said cutter spindle for moving said spindle through a cutting path in scaled reproduction of the path of movements of said tracer element; power driven spindle feed mechanism connected with said cutter spindle for moving the spindle toward the cutting station to progressively feed a cutting tool into the work piece during lateral cutting movements of the tool; said feed mechanism including, means adapted to release the spindle for return thereof to non-cutting position when a cutting tool reaches a predetermined maximum depth of cut; power means connected with said feed mechanism for continuously driving the mechanism; means adapted to return the spindle to non-cutting position upon release of the spindle; operating means connected with said indexing mechanism power control means adapted to be engaged by the cutter spindle upon return movement thereof to effect operation of said power means to actuate the indexing mechanism; means adapted to connect the feed mechanism with said spindle automatically upon completion of an indexing step by said indexing means; and means connected with said indexing means and being operable automatically thereby upon the completion of the cutting out of the last member of the series of members to stop operation of both said power driven master unit and said power driven spindle feed mechanism.

12. In combination, power actuated indexing mechanism for indexing a work piece step by step to successively position portions of the work piece at a cutting station for the cutting out on said portions of a series of integral members, respectively; said mechanism including normally inactive power means connected therewith for actuating the mechanism, and control means connected with said power means and being operable to effect and to stop operation of the power means; a cutter spindle mounted for lateral movements over the cutting station and being adapted to mount a cutting tool; said cutter spindle being also mounted for movements axially toward and from the cutting station between a position with a cutting tool at maximum depth of cut in and a position removed from a work piece; a power driven master unit including, a profile master constituting a scaled reproduction of the profile of each of the integral members to be cut from a work piece; a tracer element mounted for movements along the profile of said master, and power means for moving said tracer element; movement transmitting mechanism operatively coupling said tracer element with said cutter spindle for moving the spindle with a cutting tool laterally over the cutting station through a path in scaled reproduction of the path of movement of said tracer element; power driven spindle feed mechanism connected with said cutter spindle and being adapted to move the spindle axially toward the cutting station to progressively feed a cutting tool into a work piece during lateral movements thereof; said feed mechanism including, means adapted to release the spindle from feeding connection with the feed mechanism automatically when the cutter spindle and tool have been fed to a predetermined distance for return of the spindle to position removed from a work piece, means adapted to return said cutter spindle upon release thereof; and power means for driving said feed mechanism continuously during the feeding and return movements of said cutter spindle; and means adapted to be operated automatically by said spindle on its return movement to effect operation of the control means for the indexing mechanism power means to cause operation of the latter means to actuate the indexing mechanism.

13. In combination, indexing mechanism for indexing step by step a work piece mounted thereon to successively position portions of the work piece at a cutting station; said mechanism including, normally inactive power means connected therewith for operation to actuate said indexing mechanism, and control means for effecting and for stopping operation of said power means; a cutter spindle mounted for lateral movements over the cutting station, said cutter spindle being adapted to mount at the cutting station end thereof a cutting tool for lateral movements over the cutting station; said cutter spindle being also mounted for movements axially toward and from the cutting station between a position with a cutting tool at a predetermined maximum depth of cut in and a non-cutting position removed from the work piece; a power driven master unit including, a master profile, a tracer element mounted and constrained for movements to follow along the master profile, and an electric motor in driving connection with said tracer element for moving said element along the master profile; movement transmitting mechanism coupling said tracer element with said cutter spindle for moving said spindle with a cutting tool laterally over the cutting station through a path in scaled reproduction of the path of movement of the tracer element along the master profile; power driven spindle feed mechanism connected with said cutter spindle for feeding the spindle with a cutting tool into the work piece during lateral movements of said spindle and tool; said spindle feeding mechanism including, means for releasing the cutter spindle automatically from feeding connection with the feed mechanism for return of the spindle to non-cutting position when the tool reaches the predetermined maximum depth of cut, and an electric motor for continuously driving said feed mechanism during both periods of feed from and periods of return of said spindle to non-cutting position; means for returning automatically the cutter spindle to non-cutting position when the spindle is released by said feed mechanism; means connected with and adapted to be actuated by said cutter spindle on its return movement for effecting operation of said indexing mechanism power means to effect indexing of said mechanism; and means for adjusting independently the rate of speed of operation of the motor for moving the tracer element of said master unit and the rate of speed or operation of said motor for driving said spindle feed mechanism.

14. In combination, power driven indexing means for indexing a work piece mounted thereon step by step to successively position portions of the work piece at a cutting station for cutting out a series of integral members on said portions, respectively; said mechanism including, control means for starting and stopping indexing operation thereof; a cutter spindle mounted for lateral movements over the cutting station; said spindle being adapted to mount a cutting tool for lateral movements thereby; said cutter spindle being also mounted for movements axially toward and from the cutting station between a position with the cutting tool at a predetermined maximum depth of cut in and non-cutting position removed from the work piece; a power driven master unit including, a master profile constituting a scaled reproduction of the profile of each of the members to be cut from the work piece, a tracer element mounted for movement to follow along said master profile, a transmission connected with said tracer element, and an electric motor for driving the transmission; movement transmitting mechanism operatively coupling said tracer element with said cutter spindle for moving said spindle with a cutting tool laterally through a path in scaled reproduction of the path of movement of said tracer element along said master profile; spindle feed mechanism for progressively feeding the cutter spindle with a cutting tool into a work piece during lateral profile defining movements of said cutter spindle by said movement transmitting mechanism; said feed mechanism including, means for releasing said spindle automatically for return to non-cutting position when said cutter spindle has reached its position of maximum distance of feed into the work piece, and an electric motor for continuously driving said feed mechanism during feeding and return movements of said cutter spindle; means for returning said cutter spindle to non-cutting position when released by and disconnected from said feed mechanism; means connected with and adapted to be actuated by said cutter spindle on its return movement to operate the controlling means for said indexing mechanism power means to effect indexing actuation of the indexing mechanism; means for re-engaging said feed mechanism with said cutter spindle to initiate automatically the next feeding movement of said spindle upon each return of the spindle to non-cutting position; electrical control circuits for said master unit driving motor and for said spindle feed mechanism driving motor; a control switch for opening and closing said circuits; and means on said indexing means for engaging said switch upon completion of the cutting out of the last integral member of the series of members to cause said switch to open said control circuits to simultaneously stop operation of both of said motors.

15. In apparatus for cutting out from a blank in a single cycle an annular series of identical integral members spaced around said blank, in combination; indexing mechanism for mounting and indexing a blank step by step in a circular path to successively position at a cutting station the portions of the blank from which the annular series of integral members, respectively, are to be cut; said indexing mechanism including, normally inactive power means for actuating the mechanism, and control means connected with the power means for starting and stopping operation of the power means; a cutter spindle adapted to mount a cutting tool; said cutter spindle being mounted for universal lateral movements over and across the cutting station to move a cutting tool laterally in cutting engagement with the portion of a blank at the cutting station; said spindle being also mounted for movements axially toward and from the cutting station between a position with a cutting tool in cutting engagement with and a non-cutting position removed from the blank; a power driven master unit including, a profile master providing an endless track constituting a scaled reproduction of the profile of each of the integral members to be cut from the blank, a tracer element mounted for movements along and around the endless track of said profile master, and transmission mechanism including, power means connected with said tracer element for operation to continuously move said tracer element around the profile track; pantograph mechanism operatively coupled between said tracer element and said cutter spindle for moving said spindle with a cutting tool laterally through a path in scaled reproduction of the path of movement of said tracer element around said profile track; power driven spindle feed mechanism connected with said cutter spindle for feeding the spindle axially during lateral movements thereof progressively into a blank to a predetermined depth to complete the cutting out of the member; means connected with and under the control of said spindle feed mechanism adapted to return the spindle automatically to non-cutting position when the spindle reaches the predetermined depth to complete the member; and means connected with said indexing mechanism power control means and being adapted to be operated by said cutter spindle on its return movement to non-cutting position to effect actuation automatically of the indexing means to rotate a blank to position the next portion thereof at the cutting station.

16. In apparatus for the production of turbine wheel units by milling out from a blank in a single cycle of operations an annular series of identical integral turbine blades on the blank, in combination; indexing mechanism including, a rotatable blank support for indexing a blank thereon step by step in an annular path to successively position at a cutting station the portions of the blank from which the annular series of turbine blades are to be milled, respectively, power means for actuating said indexing mechanism, and control means connected with said power means for starting and stopping operation of said power means; a cutter spindle mounted for universal lateral movements over the cutting station of said indexing mechanism; said cutter spindle being adapted to mount a milling cutter for movements by said spindle in lateral cutting engagement through a blank at the cutting station; said spindle being also mounted for movements axially toward and from the cutting station between a position with a milling cutter in cutting engagement in and a non-cutting position removed from a blank; a power driven master unit including a profile master providing an endless track constituting a scaled reproduction of the profile around each of the integral blades to be milled from the blank, a tracer element mounted for movements along and around the endless track of the profile master, and transmission mechanism including power means therefor, for continuously moving said tracer element around the profile track; pantograph mechanism operatively coupling said cutter spindle with said tracer element for moving said spindle in scaled reproduction of the movements of the tracer element laterally through a cutting path in the blank defining the profile of the turbine blade being milled; power driven spindle feed mechanism connected with said cutter spindle for moving the spindle axially toward the cutting station to progressively feed a milling cutter into a blank to a predetermined depth to complete the blade; means operatively associated with said spindle feed mechanism adopted to return the spindle automatically to non-cutting position upon completion of the milling out of the blade by the cutter to the required depth, means connected between said cutter spindle and said indexing mechanism control means for operation by the cutter spindle upon its return movement to non-cutting position to effect actuation of the indexing mechanism to rotate the blank to position the next portion thereof at the cutting station; power means connected with said spindle feed mechanism for continuously driving such mechanism during the complete cycle of milling out all of the blades of the series; and said feed mechanism including means adapted to initiate automatically the progressive feed of the cutter spindle following the return of the spindle to non-cutting position to thereby automatically successively repeat the spindle feeding cycle for each blade.

17. In the combination as set forth in claim 16, means for adjusting the rate of speed of operation of the master unit to selectively determine the number of cutting passes the cutter spindle is caused to make for each spindle feeding cycle of said feed mechanism.

18. In the combination as set forth in claim 16, control means connected with the power means for said master unit and also with the power means for said spindle feed mechanism for stopping operation of both said master unit and said feed mechanism power means, and means connected between said control means and said indexing mechanism and being operable by actuation of said indexing mechanism on that indexing step thereof following the milling out of the last blade of the series of blades to stop operation of both of said power means.

19. In apparatus for the production of turbine wheel units by milling out from a blank in a single cycle of operations an annular series of integral turbine blades spaced around the blank, in a combination; blank indexing mechanism including, a movable blank support for indexing a blank thereon step by step in an annular path to successively position at a cutting station the portions of the blank from which the series of turbine blades are to be milled, respectively, and means for actuating said indexing mechanism; a cutter spindle mounted for universal lateral movements over the cutting station; said spindle being adapted to mount at the cutting station end thereof a milling cutter for movements laterally by said spindle in lateral cutting engagement with a blank at the cutting station; said spindle being also mounted for movements axially toward and from the cutting station between a position with a milling cutter in cutting engagement in and a non-cutting position removed from a blank; a power driven master unit including, a tracer element mounted for movements around a path constituting a scaled reproduction of the profile around each of the integral blades to be milled from the blank, and powered transmission mechanism connected with said element for continuously moving the element around the profile path; pantograph mechanism operatively coupled between said tracer element and said cutter spindle; power driven spindle feed mechanism connected with said cutter spindle adapted to move the spindle axially toward the cutting station for progressively feeding a milling cutter into a blank to a predetermined depth during lateral movements thereof to mill out the complete blade; means operatively associated with said spindle feed mechanism for arresting feed of the cutter spindle adapted to return the spindle automatically to non-cutting position when the milling out of the blade to the required depth has been completed; means connected with said indexing mechanism actuating means adapted to be operated by said cutter spindle on its return movement to non-cutting position to effect actuation of the indexing means; power means connected with said spindle feed mechanism for continuously driving said mechanism through the complete cycle of milling the series of blades on a blank; and means adapted to imitate automatically the progressive feed of the cutter spindle to repeat the spindle feeding cycle for the next blade following the return of the cutter spindle to non-cutting position.

20. In apparatus for cutting out by a rotary cutting tool from a blank in a single cycle of operations an annular series of integral members spaced around the blank, in combination; a blank indexing mechanism including, a rotatably mounted blank support for rotating a blank mounted thereon step by step to successively position at a cutting station the portions of the blank from which the integral members are to be cut out, respectively, and powered means for actuating said indexing mechanism; a rotary cutter spindle mounted for universal lateral movements over the cutting station; said spindle being adapted to mount a rotary cutting tool for movements laterally by said spindle in cutting engagement with the portions of a blank at the cutting station; said spindle being also mounted for movements axially toward and from the cutting station between a position with a tool in cutting engagement in and a non-cutting position removed from a blank; a power driven master unit including, a profile master providing an endless track constituting a scaled reproduction of the profile around each integral member, and powered transmission mechanism connected with said element adapted to continuously move the element around the endless path of said profile master; pantograph mechanism operatively coupled between said tracer element and said cutter spindle adapted to continuously move said spindle with a tool laterally through a cutting path around the profile of the integral member; power driven spindle feed mechanism connected with said cutter spindle for moving the spindle axially from non-cutting position toward the cutting station for progressively feeding a tool into a blank to a predetermined depth during lateral movements of the tool to cut out the complete integral member; said feed mechanism providing means adapted to arrest feed of the spindle when the cutter reaches a predetermined depth of cut; means connected with the spindle adapted to return the spindle automatically to non-cutting position when feed is arrested by said feed mechanism means; means connected with said indexing mechanism actuating means adapted to be operated by said cutter spindle on its return movement to non-cutting position to effect actuation of the indexing means; said feed mechanism also providing means adapted to initiate automatically a feed cycle for cutting out the next integral member of the series when the spindle is returned to non-cutting position; and power means connected with said spindle feed mechanism for continuously driving said mechanism throughout the complete series of cycles of spindle feed and return to non-cutting position for cutting out each integral member.

21. In combination, means for indexing a work piece mounted thereon to successively position portions of said work piece at a cutting station; said mechanism including intermittently operable power means for actuating the indexing mechanism step by step, and control means adapted for operation to effect operation of said power means; a cutter spindle supporting structure mounted for lateral movements; a cutter spindle adapted to mount a cutting tool; said spindle being mounted on said structure and being movable laterally thereby to move a cutting tool laterally through a work piece; said cutter spindle being also mounted on said structure for movements axially toward and from a work piece between a position with the cutting tool at maximum depth of cut in and non-cutting position removed from the work piece; means adapted to continuously bias said cutter spindle to non-cutting position; power driven spindle feed mechanism mounted on and movable with said spindle supporting structure; said feed mechanism being connected with said cutter spindle for moving the spindle toward a work piece to progressively feed a cutting tool into the work piece during movements laterally of the tool; said feeding mechanism including, a feed cam rotatably mounted on said supporting structure in continuous camming engagement with said spindle, said cam being formed to provide a camming surface having a location thereon at which said spindle is released to the control of said biasing means to move said spindle to non-cutting position, said camming surface being formed from the aforesaid location thereon around said cam to cause progressive feed of said spindle from a non-cutting position to a position of maximum depth of feed in one revolution of said cam; and said control means for the power means of said indexing mechanism being adapted to be operated by said cutter spindle upon the completion of one feeding cycle revolution of said cam.

22. In combination; means for mounting a work piece; a cutter spindle supporting structure mounted for universal lateral movements over said work piece mounting means; a cutter spindle adapted to mount a cutting tool; said cutter spindle being mounted on said supporting structure and being universally laterally movable thereby to correspondingly move a cutting tool over the work piece; said cutter spindle being also mounted on said supporting structure for movements axially toward a work piece on said mounting means to feed a cutting tool into the work piece; a profile master having a profile track thereon; a tracer member mounted for universal lateral movements to follow said profile track; a pantograph linkage pivotally coupled with said cutter spindle supporting structure and being connected with said tracer member for laterally moving said supporting structure and spindle in scaled reproduction of the lateral movements of said tracer member; a power driven spindle feeding mechanism mounted and supported on said spindle supporting structure independently of said pantograph linkage and being movable as a unit with said spindle supporting structure; said feeding mechanism being in driven connection with said cutter spindle for progressively feeding said spindle toward a work piece to thereby progressively feed a cutter on said spindle into the work piece during universal lateral movements of said spindle; and power means operatively connected with said spindle feeding mechanism for driving the latter mechanism.

ROBERT J. STUART.
ALLEN D. GUNDERSON.

References Cited in the file of this patent

UNITED STATES PATENTS

| Number | Name | Date |
|---|---|---|
| 1,235,668 | Eaton | Aug. 7, 1917 |
| 1,237,388 | Robertson | Aug. 21, 1917 |
| 1,423,154 | Rosak | July 18, 1922 |
| 1,670,413 | Kneidl | May 22, 1928 |
| 1,790,581 | Gorton | Jan. 27, 1931 |
| 2,053,400 | Kingsbury | Sept. 8, 1936 |
| 2,277,997 | Silva | Mar. 31, 1942 |
| 2,357,117 | Jonsson | Aug. 29, 1944 |
| 2,359,704 | Woody | Oct. 3, 1944 |
| 2,392,964 | Armitage | Jan. 15, 1946 |
| 2,393,727 | Aber | Jan. 29, 1946 |
| 2,433,464 | LaPlante | Dec. 30, 1947 |
| 2,443,793 | Lensky | June 22, 1948 |
| 2,517,901 | Luckenbach | Aug. 8, 1950 |

FOREIGN PATENTS

| Number | Country | Date |
|---|---|---|
| 334,698 | Great Britain | Sept. 11, 1930 |
| 557,767 | Great Britain | Dec. 3, 1943 |
| 558,215 | Great Britain | Dec. 24, 1943 |